United States Patent
Ishihara et al.

(10) Patent No.: US 12,292,824 B2
(45) Date of Patent: May 6, 2025

(54) QUALITY OF SERVICE (QOS) CONTROL IN STORAGE DEVICE AND CONTROL SYSTEM AND QOS CONTROL METHOD

(71) Applicant: Kioxia Corporation, Tokyo (JP)

(72) Inventors: Takeshi Ishihara, Yokohama Kanagawa (JP); Yohei Hasegawa, Fuchu Tokyo (JP); Kenta Yasufuku, Yokohama Kanagawa (JP); Shohei Onishi, Kawasaki Kanagawa (JP); Yoshiki Saito, Kawasaki Kanagawa (JP); Junpei Kida, Tachikawa Tokyo (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/461,217

(22) Filed: Sep. 5, 2023

(65) Prior Publication Data

US 2024/0078174 A1 Mar. 7, 2024

(30) Foreign Application Priority Data

Sep. 7, 2022 (JP) .................................. 2022-142385

(51) Int. Cl.
*G06F 12/00* (2006.01)
*G06F 12/02* (2006.01)

(52) U.S. Cl.
CPC .................................. *G06F 12/023* (2013.01)

(58) Field of Classification Search
CPC ...... G06F 12/023; G06F 3/061; G06F 3/0617; G06F 3/0631; G06F 3/0653; G06F 3/0679; G06F 3/0688; G06F 11/07; G06F 3/067

(Continued)

(56) References Cited

U.S. PATENT DOCUMENTS 11,188,243 B2   11/2021   Takata et al.
2020/0278804 A1   9/2020   Guim Bernat et al.
(Continued)

FOREIGN PATENT DOCUMENTS

CN   100399306 C   *   7/2008   ........... G06F 3/0605
JP   2005050007 A   *   2/2005

OTHER PUBLICATIONS

Unpublished U.S. Appl. No. 18/178,422, filed Mar. 3, 2023, 97 pages.

(Continued)

*Primary Examiner* — Mardochee Chery
(74) *Attorney, Agent, or Firm* — Kim & Stewart LLP

(57) ABSTRACT

An information storage device includes a storage unit, a control unit, an allocation information storage unit, a QoS parameter storage unit, and a monitoring result storage unit. The control unit creates and manages a logical storage area using the storage area of the storage unit when a storage area allocation request is received. The allocation information storage unit stores allocation information related to logical storage areas. The QoS parameter storage unit stores quality requests expected to be satisfied for a communication for using the logical storage area. The control unit monitors the operating state and characteristics of the storage unit and the communication status, and stores the results in the monitoring result storage unit. The control unit derives internal QoS parameters to be set in the information storage device from the information stored in the allocation information storage unit, the QoS parameter storage unit, and the monitoring result storage unit.

23 Claims, 32 Drawing Sheets

(58) Field of Classification Search
USPC .......................................................... 711/154
See application file for complete search history.

(56) References Cited

U.S. PATENT DOCUMENTS

| | | | |
|---|---|---|---|
| 2020/0326864 A1 | 10/2020 | Takata et al. | |
| 2021/0089225 A1* | 3/2021 | Boyd | G06F 3/0679 |
| 2021/0311646 A1 | 10/2021 | Malladi et al. | |
| 2022/0004330 A1 | 1/2022 | Guim Bernat et al. | |

OTHER PUBLICATIONS

Compute Express Link® (CXL®), Specification, Revision 2.0, Compute Express Link Consortium, Inc., Oct. 2020, 628 pages.

* cited by examiner

FIG. 3

| No. | REQUESTING DEVICE | REQUESTING TASK | TAG | SIZE | ALLOCATION INFORMATION ENTRY NUMBER | EXTERNAL QoS REQUEST ENTRY NUMBER | INTERNAL QoS PARAMETER NUMBER |
|---|---|---|---|---|---|---|---|
| 1 | $C_1$ | - | - | $SZ_{11}$ | 1 | - | - |
| 2 | $C_1$ | - | $TG_2$ | $SZ_{12}$ | 2 | 1 | 1 |
| 3 | $C_2$ | $T_{21}$ | $TG_3$ | $SZ_{21}$ | 3 | 2 | 2 |
| 4 | $C_2$ | $T_{22}$ | $TG_4$ | $SZ_{22}$ | 4 | 3 | 3 |
| 5 | $C_2$ | $T_{22}$ | $TG_5$ | $SZ_{22}$ | 5 | - | - |
| ... | ... | ... | ... | ... | ... | ... | ... |

FIG. 4

| No. | REQUEST NUMBER | ADDITIONAL FUNCTION | DEVICE NO. (1) | RANGE (1) | DEVICE NO. (2) | RANGE (2) | ... |
|---|---|---|---|---|---|---|---|
| 1 | 1 | - | $M_1$ | $PA_{1s}$-$PA_{1e}$ | - | - | ... |
| 2 | 2 | - | $M_2$ | $PA_{3s}$-$PA_{3e}$ | $M_3$ | $PA_{4s}$-$PA_{4e}$ | ... |
| 3 | 3 | MIRROR | $M_3$ | $PA_{5s}$-$PA_{5e}$ | $M_4$ | $PA_{6s}$-$PA_{6e}$ | ... |
| 4 | 3 | EC | $M_1$ | $PA_{7s}$-$PA_{7e}$ | $M_3$ | $PA_{8s}$-$PA_{8e}$ | ... |
| ... | ... | ... | ... | ... | ... | ... | ... |

*FIG. 6*

| No. | TAG | REQUEST ADDRESS | DESTINATION DEVICE | DESTINATION ADDRESS | STATISTICAL INFORMATION |
|---|---|---|---|---|---|
| 1 | - | $LA_{1s}$-$LA_{1e}$ | $M_1$ | $PA_{1s}$-$PA_{1e}$ | $S_1$ |
| 2 | $TG_2$ | $LA_{2s}$-$LA_{2m}$<br>$LA_{2n}$-$LA_{2e}$ | $M_2$<br>$M_3$ | $PA_{3s}$-$PA_{3e}$<br>$PA_{4s}$-$PA_{4e}$ | $S_2$ |
| 3 | $TG_3$ | $LA_{3s}$-$LA_{3e}$ | $M(M_3, M_4)$ | $M(PA_{5s}$-$PA_{5e}, PA_{6s}$-$PA_{6e})$ | $S_3$ |
| 4 | $TG_4$ | $LA_{4s}$-$LA_{4e}$ | $EC(M_1, M_3, \cdots)$ | $EC(PA_{7s}$-$PA_{7e}, PA_{8s}$-$PA_{8e})$ | $S_4$ |
| ... | ... | ... | ... | ... | ... |

FIG. 7A

Dev. ID=$Dev_1$, Vol. ID=$Vol_1$

| Data Time | Total Read Count | Total Write Count | Total Read Bytes | Total Write Bytes | GC Count | Erase Count |
|---|---|---|---|---|---|---|
| $T_1$ | $Val1_{Rc}$ | $Val1_{Wc}$ | $Val1_{Rb}$ | $Val1_{Wb}$ | $Val1_{GC}$ | $Val1_{EC}$ |
| ... | ... | ... | ... | ... | ... | ... |

FIG. 7B

Dev. ID=$Dev_1$, Vol. ID=$Vol_1$

| Data Time | Item | Value |
|---|---|---|
| $T_1$ | Total Read Count | Val1 |
| $T_2$ | Total Write Bytes | Val2 |
| ... | ... | ... |

FIG. 7C

Dev. ID=$Dev_1$, Vol. ID=$Vol_1$, Item=Total Read Count

| Data Time | Value |
|---|---|
| $T_1$ | Val1 |
| $T_2$ | Val2 |
| ... | ... |

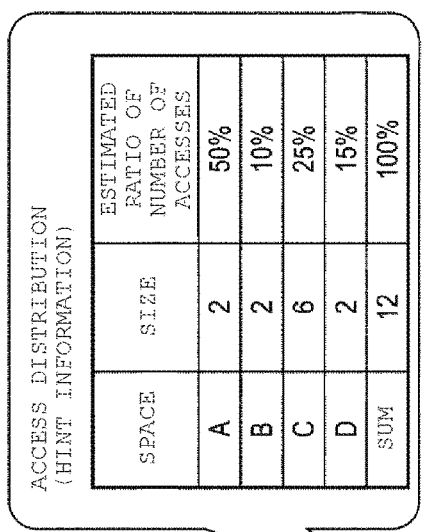
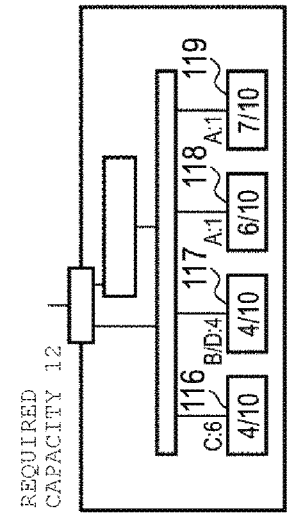
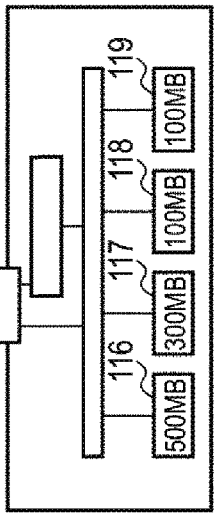
FIG. 9E CASES OF NOT EQUALLY DIVIDING
FIG. 9F
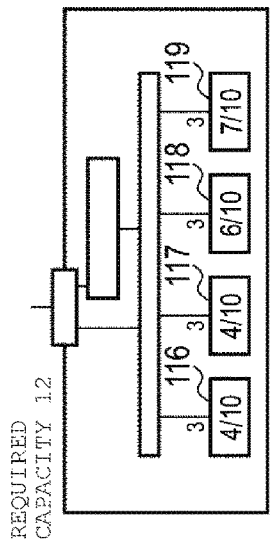
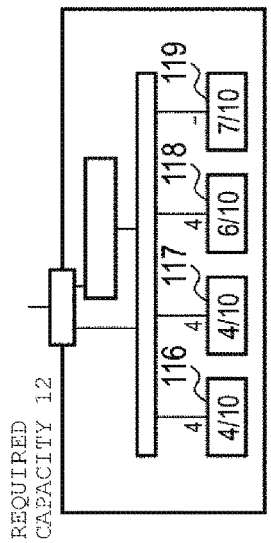
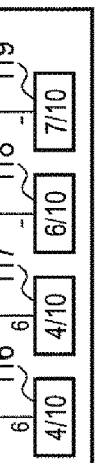
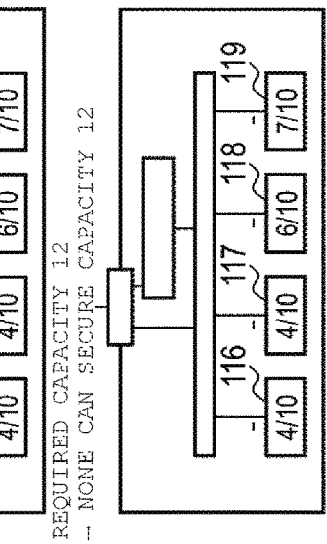
FIG. 9A WHEN REQUIRED CAPACITY IS DIVIDED EQUALLY
FIG. 9B
FIG. 9C
FIG. 9D

FIG. 12A

EXTERNAL QoS REQUEST

| No. | IN PRIORITY | IN DELAY (us) | IN BAND (bps) | OUT PRIORITY | OUT DELAY (us) | OUT BAND (bps) |
|---|---|---|---|---|---|---|
| 1 | $P_{in}1$ | $L_{in}1$ | $B_{in}1$ | $O_{out}1$ | $L_{out}1$ | $B_{out}1$ |
| 2 | $P_{in}2$ | - | $B_{in}2$ | $O_{out}2$ | - | $B_{out}2$ |
| 3 | - | - | $B_{in}3$ | - | - | $B_{out}3$ |
| 4 | $P_{in}4$ | - | - | $O_{out}4$ | - | - |
| ... | ... | ... | ... | ... | ... | ... |

INTERNAL QoS REQUEST

| No. | IN PRIORITY | IN BAND (%) | OUT PRIORITY | OUT BAND (%) |
|---|---|---|---|---|
| 1 | $P_{in}1$ | $B_{in}1$ | $P_{out}1$ | $B_{out}1$ |
| 2 | $P_{in}2$ | $B_{in}2$ | $P_{out}2$ | $B_{out}2$ |
| 3 | - | $B_{in}3$ | - | $B_{out}3$ |
| 4 | $P_{in}4$ | - | $P_{out}4$ | - |
| ... | ... | ... | ... | ... |

| No. | TARGET ELEMENT | METRICS | MONITORING METHOD | MONITORING INTERVAL | PROCESSING RULE |
|---|---|---|---|---|---|
| 1 | M1 | Total Write Count | Polling | 60 | - |
| 2 | M1 | Write Error | Push | - | - |
| 3 | SW.p1 | Total Send Bytes | Polling | 15 | - |
| 4 | SW.p1 | Total Send Bytes | 3 | - | delta(prev) |
| 5 | SW.p2 | Total Receive Bytes | Polling | 15 | - |
| 6 | SW.p2 | Total Receive Bytes | - | - | delta(prev) |
| 7 | SW | Total Send Bytes | 4,... | - | sum(4,...) |
| ... | ... | ... | ... | ... | ... |

| No. | TARGET ELEMENT | REQUIRED METRICS | REVIEW CONDITIONS | THRESHOLD | CALCULATION RULE |
|---|---|---|---|---|---|
| 1 | M* | Write Error | NUMBER OF WRITE ERRORS IS EQUAL TO OR EXCEEDS SPECIFIED NUMBER OF TIMES | $T_{WE\_count}$ | - |
| 2 | M* | Write Error | INTERVAL BETWEEN OCCURRENCES OF WRITE ERRORS IS EQUAL TO OR BELOW THRESHOLD | $T_{WE\_int}$ | ACQUIRE INTERVAL OF ERROR NOTIFICATION OCCURRENCES IN PAST X DAYS |
| 3 | M* | Total Write Bytes Total Read Bytes | THROUGHPUT OF EITHER WRITE OR READ HAS REDUCED TO BELOW THRESHOLD | $T_{RTH(L)}$ $T_{WTH(L)}$ | ACQUIRE TIME CHANGE OF READ THROUGHPUT AND WRITE THROUGHPUT FROM CHANGES IN NUMBER OF READ BYTES AND NUMBER OF WRITE BYTES IN PAST X DAYS |
| 4 | M* | Read Response Time | AVERAGE READ DELAY EXCEEDS THRESHOLD | $T_{RL}$ | ACQUIRE AVERAGE VALUE FROM READ DELAYS IN PAST X DAYS |
| 5 | M* | GC exec time | GC EXECUTION FREQUENCY EXCEEDS THRESHOLD | $T_{GC\_int}$ | ACQUIRE FREQUENCY FROM STORAGE TIMES OF GC EXECUTION EVENTS IN PAST X DAYS |
| 6 | M* | Read Error | OCCURRENCE RATE OF READ ERRORS IS EQUAL TO OR GREATER THAN A SPECIFIED RATE | $T_{RE\_rate}$ | ACQUIRE AVERAGE ERROR RATE FROM NUMBER OF READ ERRORS IN PAST X DAYS |
| 7 | SW.p* | Queue length | AVERAGE VALUE OF QUEUE LENGTHS EXCEEDS THRESHOLD | $T_{QL}$ | ACQUIRE AVERAGE OF QUEUE LENGTHS IN PAST X DAYS |
| ... | ... | ... | ... | ... | ... |

FIG. 25

| STORAGE TIME | EVALUATION TARGET | FAILURE POSSIBILITY | FAILURE CONTENT |
|---|---|---|---|
| T1 | M1 | $V_{11}$ | - |
| T1 | M2 | $V_{21}$ | - |
| T2 | M2 | $V_{22}$ | - |
| T2 | M3 | $V_{23}$ | - |
| T2 | M4 | $V_{24}$ | - |
| T3 | M1 | $V_{31}$ | THROUGHPUT REDUCED |
| T3 | M2 | $V_{32}$ | - |
| T4 | M1 | $V_{41}$ | THROUGHPUT REDUCED |
| ... | ... | ... | ... |

| STORAGE TIME | EVALUATION TARGET | TARGET RANGE | FAILURE POSSIBILITY | FAILURE CONTENT |
|---|---|---|---|---|
| T1 | M1 | - | $V_{11}$ | - |
| T1 | M2 | - | $V_{21}$ | - |
| T2 | M2 | - | $V_{22}$ | - |
| T2 | M3 | - | $V_{23}$ | - |
| T2 | M4 | - | $V_{24}$ | - |
| T3 | M1 | $A_1$-$A_2$ | $V_{31}$ | THROUGHPUT REDUCED |
| T3 | M2 | - | $V_{32}$ | - |
| T4 | M1 | $A_1$-$A_2$ | $V_{41}$ | THROUGHPUT REDUCED |
| ... | ... | ... | ... | ... |

FIG. 28A

| AREA | UPDATE TIME | ELEMENT 1 | ELEMENT 2 | ... |
|---|---|---|---|---|
| A1 | T1 | $Frag_{11}$ | $Frag_{12}$ | ... |
| A2 | T2 | $Frag_{21}$ | $Frag_{22}$ | ... |
| ... | ... | ... | ... | ... |

FIG. 28B

| AREA | DEVICE | UPDATE TIME | ELEMENT 1 | ELEMENT 2 | ... |
|---|---|---|---|---|---|
| A1 | M1 | T1 | $Frag_{111}$ | $Frag_{112}$ | ... |
| A2 | M1 | T2 | $Frag_{211}$ | $Frag_{212}$ | ... |
| A2 | M2 | T2 | $Frag_{221}$ | $Frag_{211}$ | ... |
| ... | ... | ... | ... | ... | ... |

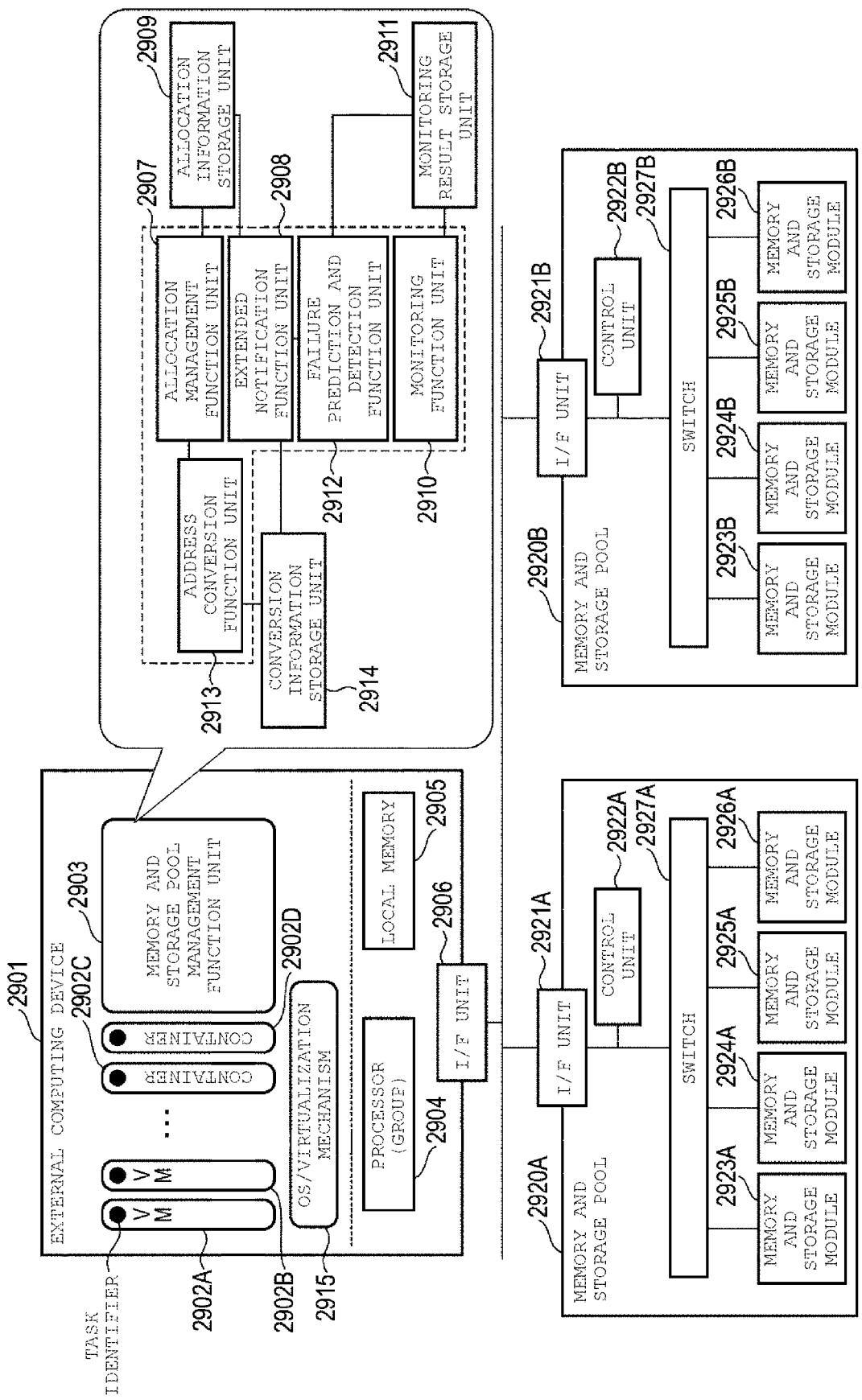

QUALITY OF SERVICE (QOS) CONTROL IN STORAGE DEVICE AND CONTROL SYSTEM AND QOS CONTROL METHOD

CROSS-REFERENCE TO RELATED APPLICATION

This application is based upon and claims the benefit of priority from Japanese Patent Application No. 2022-142385, filed Sep. 7, 2022, the entire contents of which are incorporated herein by reference.

FIELD

Embodiments described herein relate generally to a storage device, a control system, and a control method.

BACKGROUND

A memory and storage pool device that provides a group of computing resources such as central processing units (CPUs) with memory resources that can be used for main memory applications is known. One type of such a memory and storage pool device receives a service level agreement (SLA) for each of virtual computers and controls access to the memory resources to satisfy the SLA.

However, with such technology, quality control of an external network and quality control of an internal network are not coordinated with each other, and when the state of the memory resources that make up the memory and storage pool device changes, there is a possibility that the expected quality cannot be achieved.

Compute Express Link® (CXL®) 2.0 specifies a mechanism in which the memory and storage pool device checks the normality and health of the memory modules in the device, issues an external warning based on the results, and notifies the reason.

However, according to the technology, it is not possible to notify a program running on the external CPU of failures, and the external CPU receiving the notification has to perform a detailed check.

Due to such problems, the related technology has a possibility that quality of service (QoS) control for the memory and storage pool device cannot be performed sufficiently.

BRIEF DESCRIPTION OF THE DRAWINGS

FIG. 3 is a diagram showing an example of allocation request information stored in the memory and storage pool device.

FIG. 4 is a diagram showing an example of updating allocation information in the memory and storage pool device.

FIG. 6 is a diagram showing an example of information relating to address conversion in the memory and storage pool device.

FIGS. 7A to 7C are diagrams showing an example of characteristic information used in the memory and storage pool device.

FIGS. 9A to 9F are diagrams showing an example of obtaining a set of memory and storage modules that satisfies the required capacity in the memory and storage pool device.

FIGS. 12A and 12B are diagrams showing an example of information used by the QoS control function unit in the memory and storage pool device.

FIG. 17 is a diagram showing an example of a monitoring target list stored in the memory and storage pool device according to the third embodiment.

FIG. 18 is a diagram showing an example of review conditions stored in the memory and storage pool device according to the third embodiment.

FIG. 25 is a diagram showing an example of information stored in an evaluation result storage unit in the memory and storage pool device according to the sixth embodiment.

FIGS. 28A and 28B are diagrams showing an example of an allocatable list stored in the memory and storage pool device according to the seventh embodiment.

FIG. 29 is a schematic diagram of a system of an eighth embodiment.

DETAILED DESCRIPTION

Embodiments provide an information storage device, control system and control method implementing appropriate QoS control.

In general, according to an embodiment, the information storage device can be connected to one or more computing devices via a communication channel. The information storage device may include a storage unit, a control unit, an allocation information storage unit, a QoS parameter storage unit, and a monitoring result storage unit. The storage unit may include one or more storage devices. The control unit may include an allocation management function unit that controls the storage unit, creates a logical storage area using storage areas of the one or more storage devices when a storage area allocation request is received from the computing device, and manages the logical storage area in association with the computing device that is a transmission source of the allocation request. The allocation information storage unit may store allocation information of the storage areas of the one or more storage devices related to the logical storage area managed by the allocation management function unit. The QoS parameter storage unit may store all or part of quality requests expected to be satisfied by the communication channel for communication for using the logical storage area. The monitoring result storage unit may store the results of monitoring of the storage unit and the communication channel. The control unit may further include a monitoring function unit and a QoS control function unit. The monitoring function unit may monitor an operating state of the storage unit, characteristics of the one or more storage devices provided in the storage unit which change with use, and a communication status of the communication channel, and store the results in the monitoring result storage unit. The QoS control function unit may derive internal QoS parameters to be set in the information storage device from information stored in the allocation information storage unit, the QoS parameter storage unit, and the monitoring result storage unit and store the internal QoS parameters in the QoS parameter storage unit in association with a quality request for the communication channel.

Hereinafter, embodiments will be described with reference to the drawings.

First Embodiment

First, a first embodiment will be described. The first embodiment relates to a memory and storage pool device that has a mechanism for coordinating a QoS control for external network and a QoS control for internal network and that implements appropriate QoS control.

Figure 1:
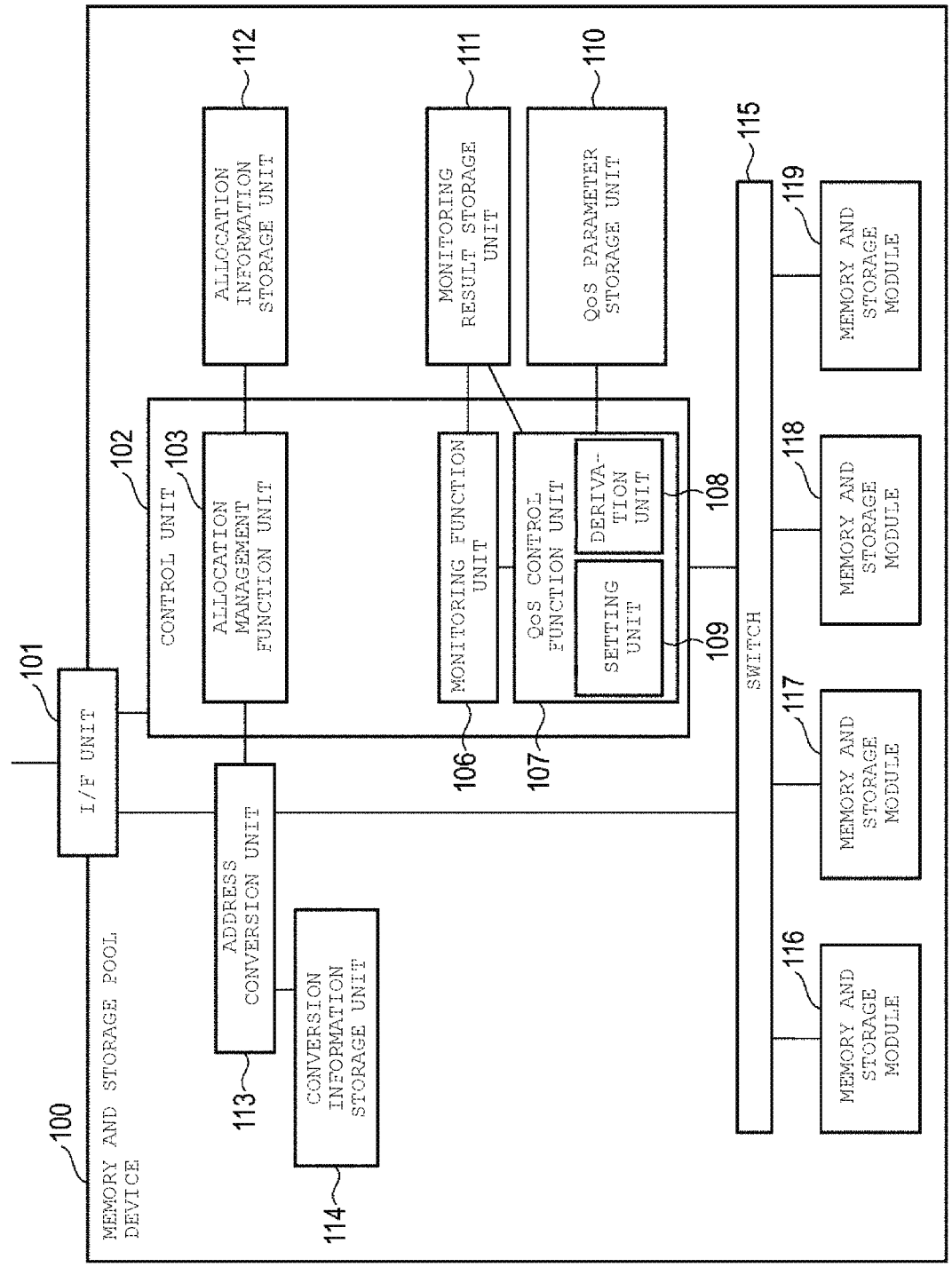
FIG. 1 is a diagram showing a configuration example of a memory and storage pool device according to a first embodiment.

FIG. 1 is a diagram showing a configuration example of a memory and storage pool device 100 according to the first embodiment. While FIG. 1 illustrates the memory and storage pool device 100 only, the memory and storage pool device 100 may be connected to an external computing device provided with a CPU or the like, receive control commands related to memory read/write and storage I/O control commands from the external computing device, and perform operations according to the commands. In FIG. 1, the data storage device of the memory and storage pool device 100 is described without distinguishing between when it is formed as a "memory" and when it is formed as a "storage", but in the first embodiment, it is assumed that the data storage device is formed as either one of them. The external computing device may also be referred to as the computing device. The memory and storage pool device may also be referred to as an information storage device or a storage device. A system in which the external computing device and the information storage device are connected to each other via a network may also be referred to as a control system or a system.

An I/F unit 101 is a network interface that connects the memory and storage pool device 100 to the external computing device. For example, a network or the like based on Compute Express Link (CXL) or IEEE 802.3 may be used.

A control unit 102 is an element that controls operations of the memory and storage pool device 100. The control unit 102 includes an allocation management function unit 103, a monitoring function unit 106, and a QoS control function unit 107. The QoS control function unit 107 also includes a derivation unit 108 and a setting unit 109. Although each of the components is described as an internal functional block configured as hardware in FIG. 1, the control unit 102 may be implemented by a processor, and the components may be implemented as software operating thereon. Some of the elements may be implemented as hardware functional blocks and some other elements may be implemented as software functional blocks.

The QoS control function unit 107 is a functional block that controls settings related to QoS between the external network and the internal network of the memory and storage pool device 100. The derivation unit 108 derives the QoS settings (, which may be referred to as implementation QoS parameters) of the internal network based on the values monitored by the monitoring function unit 106 and the external QoS information (, which may be referred to as requested QoS parameters) notified from the outside of the memory and storage pool device 100. The setting unit 109 is a functional block that reflects the internal QoS settings derived by the derivation unit 108. The QoS control function unit 107 stores internal QoS parameters (, which may be referred to as implementation QoS parameters) derived by the derivation unit 108 in a QoS parameter storage unit 110. Here, the QoS control function unit 107 stores the internal QoS parameters in association with external QoS parameters (, which may be referred to as requested QoS parameters) that are used for deriving the internal QoS parameters, in which the external QoS parameters are notified from the external computing device.

The monitoring function unit 106 is a functional block that monitors the operation of the memory and storage pool device 100 and stores the monitoring results in a monitoring result storage unit 111. The object of monitoring includes, for example, operating state, input and output amount and response delay of each of memory and storage modules 116 to 119, transfer amount and transmission delay of a switch 115, transmission and reception volume, transmission and reception throughput, and transmission delay related to communication with the external computing device via the I/F 101, the number of address conversions executed by an address conversion unit 113, and the like. The details of the monitoring method and storage of the monitoring results will be described below.

The allocation management function unit 103 is a functional block that manages the correspondence between the allocated capacities of the memory and storage modules 116 to 119 of the memory and storage pool device 100 and the tasks (e.g., programs) that execute on the external computing device. An allocation request is notified from the external computing device via the I/F unit 101, and the allocation management function unit 103 determines a memory and storage module that can handle the required capacity based on the usage state of each of the memory and storage modules 116 to 119. An allocation information storage unit 112 stores the allocation information generated as a result.

The address conversion unit 113 has a function of converting an address, which is added to the command when the external computing device connected to the memory and storage pool device 100 controls the memory and storage pool device 100, into an address of each of the memory and storage modules 116 to 119 in the memory and storage pool device 100. Information used for conversion is stored in a conversion information storage unit 114, and the address conversion unit 113 appropriately performs the conversion process by referring to the information. The information in the conversion information storage unit 114 is appropriately updated as the allocation management function unit 103 changes the allocation to each of the memory and storage modules 116 to 119, and the like.

The switch 115 has a function of communicating between the I/F unit 101 and the memory and storage modules 116 to 119 in the memory and storage pool device 100. For example, a PCIe switch, a CXL switch, or the like may be used.

The memory and storage modules 116 to 119 may be a memory module including memory devices such as dynamic random access memory (DRAM) and storage class memory (SCM) that can be read and written in small units by LOAD/STORE commands, or a storage module including a storage device such as solid state drive (SSD) or hard disk drive (HDD) that can be read or written by READ/WRITE commands in units of blocks. It should be noted that the memory and storage pool device 100 includes both the memory device and the storage device, and the corresponding module from the memory and storage modules may be selectively used according to the command received via the I/F unit 101. However, for the sake of simplicity, it will be described in the first embodiment that only one of them is provided.

Figure 2:
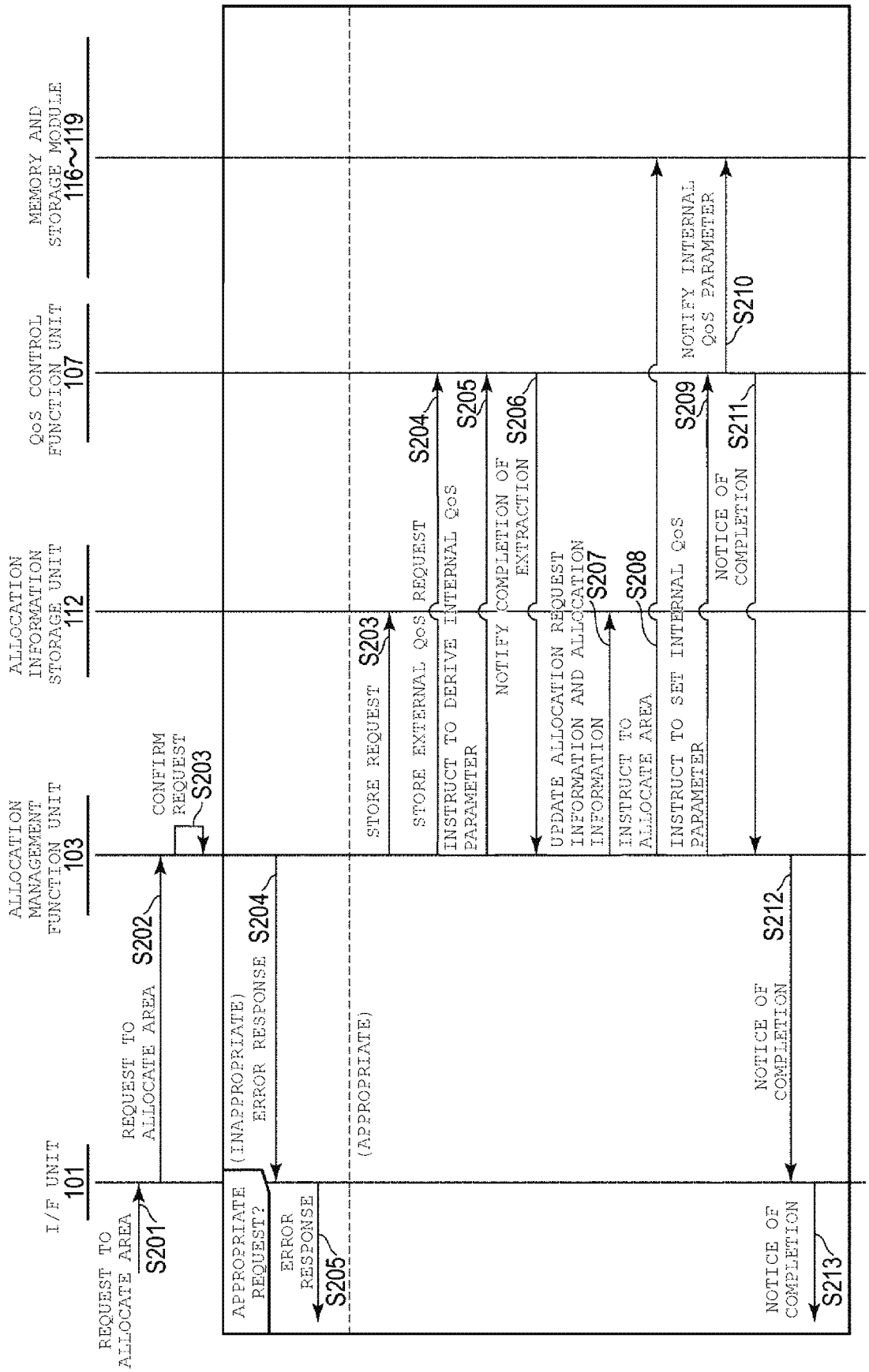
FIG. 2 is a sequence diagram showing the flow of operations for requesting to allocate an area in the memory and storage pool device.

FIG. 2 is a sequence diagram showing a flow of operations for requesting the memory and storage pool device 100 to allocate an area (, which may be referred to as storage space). The operation is started by receiving a request to allocate an area via the I/F unit 101 (S201). The received request is transmitted from the I/F unit 101 to the allocation management function unit 103 of the control unit 102 (S202). The allocation management function unit 103 checks the content of the request and determines whether the allocation request is legitimate (S203). Here, a legitimate allocation request is a request that includes a size of the requested area and an identifier of the external computing device as a destination of the allocation. The request may also include an identifier of the task running on the external computing device, but not essentially required in the first embodiment. The request may also include information on QoS to be applied to the requested area.

If the request is not legitimate, the allocation management function unit 103 generates an error response (S204), transmits the error response to the request source (S205), and ends the process. If the request is legitimate, the allocation management function unit 103 stores the content of the request in the allocation information storage unit 112.

FIG. 3 is a diagram showing an example of information stored in the allocation information storage unit 112. FIG. 3 is an example of the allocation request information that includes entries including seven elements. The allocation request information has an identifier (No.) that identifies each entry. The allocation request information stores a "request source device," which specifies a device that requested to allocate an area, a "request source task," which specifies a task that utilizes the allocated area on the external computing device specified as the request source device, a "tag," which is used to store the correspondence between an allocation request and an access when receiving the access from the external computing device, a "size" of the area requested to be allocated when occurred, an "allocation information entry number," which is a pointer to the information on the allocated area, an "external QoS request entry number," which is a pointer to the external QoS request received along with the request, and an "internal QoS parameter number," which is a pointer to the internal QoS parameter derived in the memory and storage pool device 100 based on the external QoS request. Of the fields and excluding the identifier No. field, required fields are the three fields of "request source device", "size", and "allocation information entry number", and the other fields are optional.

Entry No. 1 in FIG. 3 is an entry having only the required information, and No. 2 is an entry added with the QoS request. As described above, even for the same request source device, it may or may not include the external QoS request, and the allocation request information corresponds to each of these. Fields Nos. 3 to 5 are examples including the information of the request source task, and here as well, even when the external QoS request is not included as in the case of field No. 5, the allocation management function unit 103 manages the allocation request information by making an appropriate association.

Return to the sequence diagram of FIG. 2. When QoS setting is requested to be performed along with the area allocation, the allocation management function unit 103 stores the request in the QoS parameter storage unit 110 via the QoS control function unit 107 to treat the request as an external QoS request (S204), and also instructs the QoS control function unit 107 to derive the internal QoS parameters (S205). When the derivation is completed (S206), the allocation management function unit 103 updates the target entry of the allocation request information and also updates the corresponding allocation information (S207).

FIG. 4 is a diagram showing an example of the allocation information updated as a result. The allocation information shown in FIG. 4 includes an identifier (No.) for each entry and fields having four types of information. A "request number" field is information for specifying the allocation request information shown in FIG. 3. For example, entry No. 1 in FIG. 3 stores 1 as the allocation information entry number, and entry No. 1 in FIG. 4 stores 1 as the request number. An "additional function" field describes, rather than simply storing, whether to apply a certain process before the storing when storing information in the allocated area, and if so, what kind of process is to be performed. For example, entry No. 3 indicates to perform mirroring, that is, to store the same information in the allocated area, and entry No. 4 indicates to apply erasure coding.

Return to the sequence diagram of FIG. 2 again. The allocation management function unit 103 instructs to allocate an area to the memory and storage modules 116 to 119 (S208). The allocation management function unit 103 instructs the QoS control function unit 107 to set the derived internal QoS parameters (S209). The QoS control function unit 107 sets the derived internal QoS parameters for the memory and storage modules 116 to 119 and the switch 115 (not shown in the sequence diagram of FIG. 2) allocated with the area (S210), and notifies the allocation management function unit 103 of the completion of setting (S211). The allocation management function unit 103 generates and transmits a response indicating the completion of allocation (S212, S213).

It should be noted that when external QoS is not requested along with the area allocation, the allocation management function unit 103 may execute the operations described above with the lowest priority of QoS request (best effort), or may skip the process related to the QoS function and execute the operation.

Figure 5A:
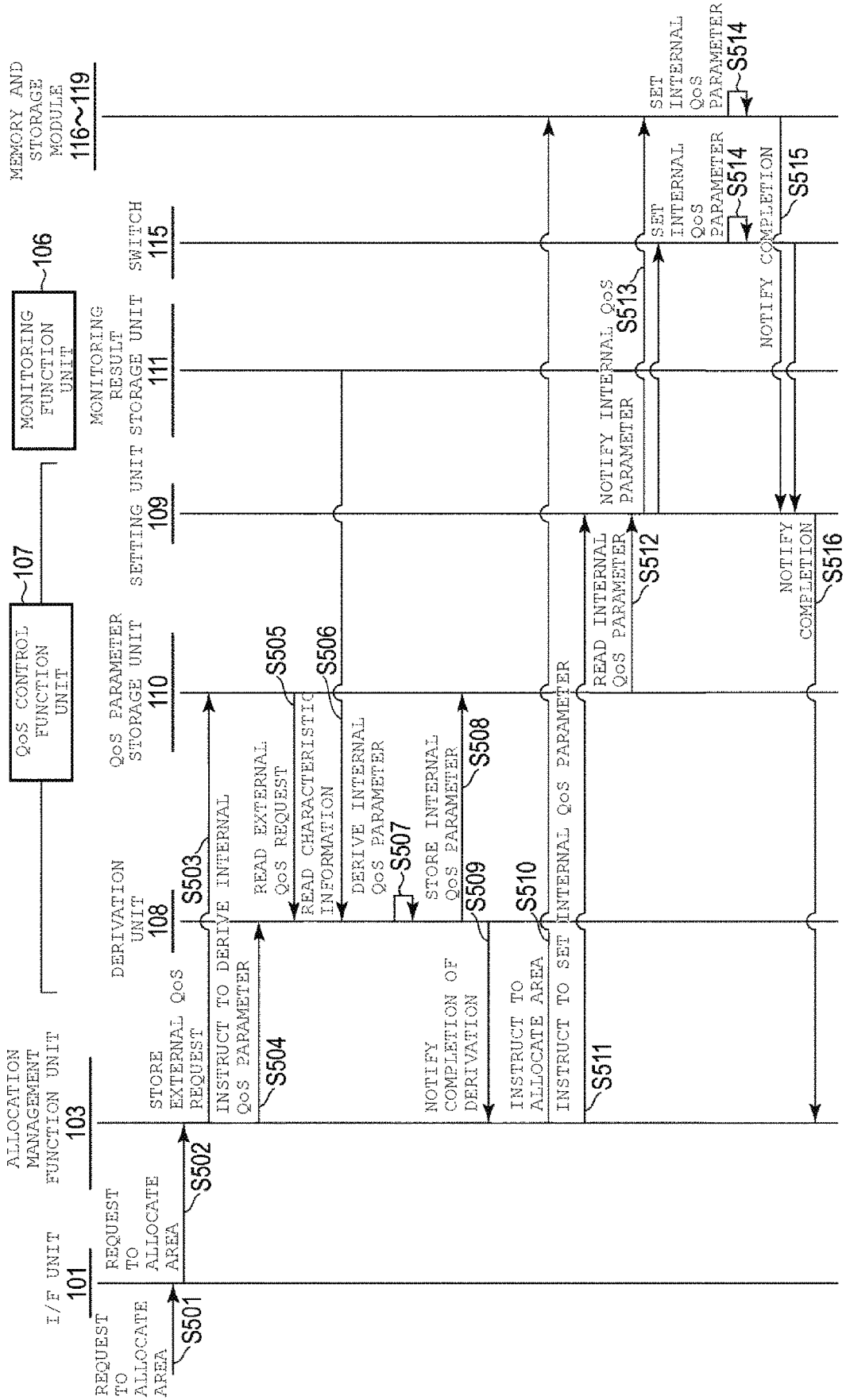
FIG. 5A is a first sequence diagram showing the flow of operations for requesting QoS for reading and writing using the allocated area in the memory and storage pool device.
Figure 5B:
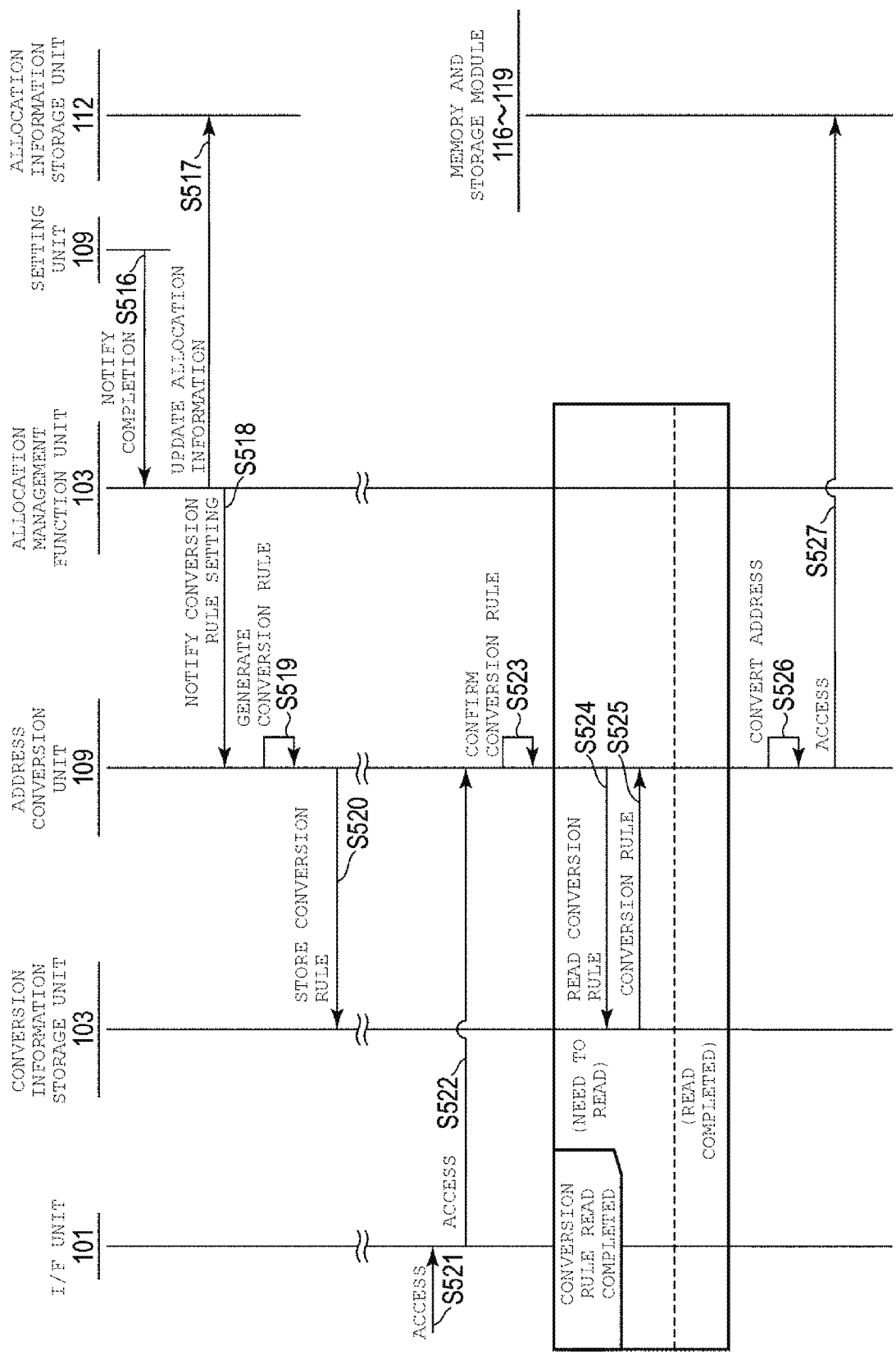
FIG. 5B is a second sequence diagram showing the flow of operations for requesting QoS for reading and writing using the allocated area in the memory and storage pool device.

FIGS. 5A and 5B show in detail the flow of operations for requesting QoS for reading and writing using the area in the area allocating process described above. It should be noted that some of the operations described with reference to FIG. 2 are omitted. The operation is started by receiving a request to allocate an area via the I/F unit 101 (S501). The received request is transmitted from the I/F unit 101 to the allocation management function unit 103 of the control unit 102. The allocation management function unit 103 checks the content, and when external QoS is requested along with the area allocation, the allocation management function unit 103 stores the request in the QoS parameter storage unit 110 as an external QoS request (S503). In the following description, it is assumed that external QoS is requested. If the external QoS is not requested, the allocation management function unit 103 executes only the instruction to allocate an area (S510).

If the external QoS is requested, the allocation management function unit 103 instructs the derivation unit 108 of the QoS control function unit 107 to derive internal QoS parameters (S504). Upon receiving the instruction to derive the internal QoS parameters, the derivation unit 108 reads the external QoS request stored in the QoS parameter storage unit 110 at S503 (S505). The derivation unit 108 reads the characteristic information stored in the monitoring result storage unit 111 (S506). The characteristic information includes usage and operation states of the memory and storage modules 116 to 119 and the switch 115 (the total input and output volume and number of requests, the input and output volume and number of requests per unit time, and for the memory and storage modules, parameters specific to the storage medium, such as the number of erasures and the number of error correction executions may be included).

Then, the derivation unit 108 derives internal QoS parameters based on the read external QoS request and characteristic information (S507). Details of the process of deriving the internal QoS parameters will be described below. If derivation is successful, the derivation unit 108 stores the internal QoS parameters in the QoS parameter storage unit 110 (S508). The derivation unit 108 then notifies the allocation management function unit 103 that a series of derivation processes is completed (S509). It should be noted that if the internal QoS parameters that satisfy the external QoS request cannot be derived (for example, the requested bandwidth cannot be internally allocated), the derivation unit 108 does not execute the storage process at S508, and notifies a parameter derivation error during the notification of derivation completion (S509).

If the internal QoS parameters can be successfully derived, the allocation management function unit 103 instructs the memory and storage modules 116 to 119 corresponding to the internal QoS parameters to allocate the corresponding area (S510). Here, an instruction is given to the memory and storage modules 116 to 119 to allocate the area, but in another implementation, it is possible to confirm that the area can be allocated and then execute the actual allocation of the area later. When the area can be allocated, the allocation management function unit 103 instructs the setting unit 109 to set and apply the internal QoS parameters (S511). When the area cannot be allocated, the allocation management function unit 103 responds to a source of the request through the I/F unit 101 with an error without instructing to set the internal QoS parameters.

Upon receiving the instruction to set the internal QoS parameters, the setting unit 109 reads the internal QoS parameters from the QoS parameter storage unit 110 (S512). The parameters read in the process are notified as appropriate identifiers in the instruction of the previous step (S511). The setting unit 109 converts the read internal QoS parameters into a form that may be set in the memory and storage modules 116 to 119 and the switch 115, and notifies the same respectively (S513).

The memory and storage modules 116 to 119 and the switch 115 receiving the notification of the internal QoS parameters each execute a process such that appropriate QoS parameters are applied to the corresponding area (S514). Then the completion of the application is notified by each of the memory and storage modules 116 to 119 and the switch 115 (S515). Upon receiving the completion notification from each target, the setting unit 109 notifies the allocation management function unit 103 of the completion of setting (S516). If even one of the memory and storage modules 116 to 119 or the switch 115 that notified the application of the internal QoS parameter returns an error indicating that application is not possible, the setting unit 109 performs a process to cancel the application of the internal QoS parameters to each part for which the notification of completion is transmitted, and returns an error to the allocation management function unit 103 (the flow of error process is not shown).

Upon receiving the completion of setting (S516), the allocation information stored in the allocation information storage unit 112 is updated (S517), and then the allocation management function unit 103 notifies the address conversion unit 113 of the setting of the conversion rule (S518). The notification includes an address to be used by the external computing device for access, an identifier of the allocated memory and storage module, and a corresponding address. The address conversion unit 113 receiving the notification generates a conversion rule (S519). The conversion rule is a rule for associating the notified external address described above with the internal address of the memory and storage pool device 100. The address conversion unit 113 stores the generated rule in the conversion information storage unit 114 (S520).

It is assumed that access to the memory and storage module occurs while the conversion rule is stored (S521). Upon receiving the access (S522), the address conversion unit 113 determines whether the corresponding conversion rule is stored (S523). If there is no necessary conversion rule, the address conversion unit 113 reads the corresponding rule from the conversion information storage unit 114

(S524, S525). Then the address conversion unit 113 performs address conversion (S526), and transfers the access to the corresponding module from the memory and storage modules (S527). It should be noted that although not described herein, the address conversion unit 113 may have a function of appropriately measuring operation information to be provided to the monitoring function unit 106, such as the number of address conversions.

The flow of allocating the area in the memory and storage pool device 100 and setting the internal QoS parameters, and the subsequent flow of accessing the memory and storage module have been described above. As such, the memory and storage pool device 100 appropriately derives not only the parts related to the transmission of response data from the memory and storage pool device 100 to the outside, but also the internal QoS parameters, and manages together with the area to implement the QoS requested from the outside. As a result, the memory and storage pool device 100 can achieve the requested QoS that cannot be achieved only by transmitting the response data.

FIG. 6 shows an example of information related to the address conversion that is used by the address conversion unit 113 and stored in the conversion information storage unit 114. Each entry includes the identifier (No.), the "tag" shown in FIG. 3, an address added to the access by an external computing device that is the subject of access, a destination device in the memory and storage pool device 100 that appropriately processes the access, an address for the destination device, and statistical information related to the entry. Regarding entry No. 2, since entry No. 2 in FIG. 4 has a plurality of memory and storage modules allocated, the conversion table is configured accordingly. Entry No. 3 in FIG. 4 has the mirroring function applied, and the notation M( . . . ) in entry No. 3 of FIG. 6 is used for each memory and storage module in the same manner and indicates that one address on the requesting side is converted into multiple destination addresses. Likewise, the notation EC( . . . ) in entry No. 4 in FIG. 4 indicates that the erasure coding is applied to perform distributed writing to the target devices. The memory and storage modules and the addresses are calculated and converted appropriately in the determined range.

Now, monitoring of the characteristic information and failure information of the memory and storage modules 116 to 119 and the switch 115, which is performed by the monitoring function unit 106 of the control unit 102, will be described. The monitoring function unit 106 acquires periodically stored values via an interface for storing and outputting the usage and operation states of the memory and storage modules 116 to 119 and the switch 115, or receives notifications from the memory and storage modules 116 to 119 and the switch 115 via the interface, thereby monitoring the characteristic information and failures. Here, whether the monitoring function unit 106 actively acquires the information or the information is passively notified differs depending on where the information is generated. For example, the characteristic information of the total input data amount is information that is generally stored internally because the information is continuously added in the device, and is not information that is notified to the outside each time the information is updated. Therefore, the monitoring function unit 106 actively acquires the total amount of input data. Meanwhile, when it is detected that the memory and storage modules 116 to 119 connected to the switch 115 stopped responding, the information can be detected more quickly if the switch 115 immediately notifies the detection to the outside. Accordingly, the monitoring function unit 106 passively receives failure notifications from the switch 115.

As described above, the characteristic information monitored by the monitoring function unit 106 includes a group of basic parameters related to input and output, such as, the total input data amount (write data amount) with respect to the memory and storage modules 116 to 119, the total output data volume (read data volume), the total number of input requests (write count), the total number of output requests (read count), the input data volume per unit time (write data volume, write throughput), the output data volume per unit time (read data volume, read throughput), the number of input requests per unit time (write IOPS), the number of output requests per unit time (read IOPS), and operating temperature. According to the storage media that form the memory and storage modules 116 to 119, there is also a group of parameters such as the number and frequency of erasures, the number and frequency of executions of error correction, the number and frequency of executions of wear leveling, and the number and frequency of executions of garbage collection (compaction). For the switch 115, a group of parameters such as the number of errors in transmitting a request, the number of errors in receiving a request, the number of losses in transmitting a request, and the number of losses in receiving a request may be considered.

The information monitored and collected by the monitoring function unit 106 is converted into an appropriate form and stored in the monitoring result storage unit 111. The amount of information to be stored varies depending on the available capacity of the monitoring result storage unit 111. As an example, it is assumed that a failure prediction and detection function unit 1905 (refer to FIG. 19) in the fourth embodiment to be described below may store the amount of data necessary for failure prediction. For example, while the monitoring function unit 106 is periodically storing parameters in the monitoring result storage unit 111, if the failure prediction and detection function unit 1905 is executing an algorithm that predicts the probability of occurrence of a failure using the results of the past 10 times, it is assumed that ten or more values are stored for the corresponding parameter.

FIG. 7 is a diagram showing an example of the characteristic information stored in the monitoring result storage unit 111. FIG. 7A is an example in which information acquired for a certain volume of a certain device is collectively stored according to the acquisition time. It should be noted that, even when a plurality of pieces of characteristic information cannot be acquired with a single information acquisition request, if the time is approximately the same, a plurality of acquisition operations may be performed, and the results may be combined into one entry. One, or a plurality of pieces of information may be stored in one entry. While only one device and one volume are shown herein, the same form of storage applies for the other devices and volumes. FIG. 7B shows a case in which a monitoring item name (i.e., identifier) and a value are stored together with the monitoring time for a certain volume of a certain device. FIG. 7C shows a form in which monitoring times and values are stored for a certain device, a certain volume, and a certain item. There is no problem in implementing the first embodiment with either format.

Figure 8:
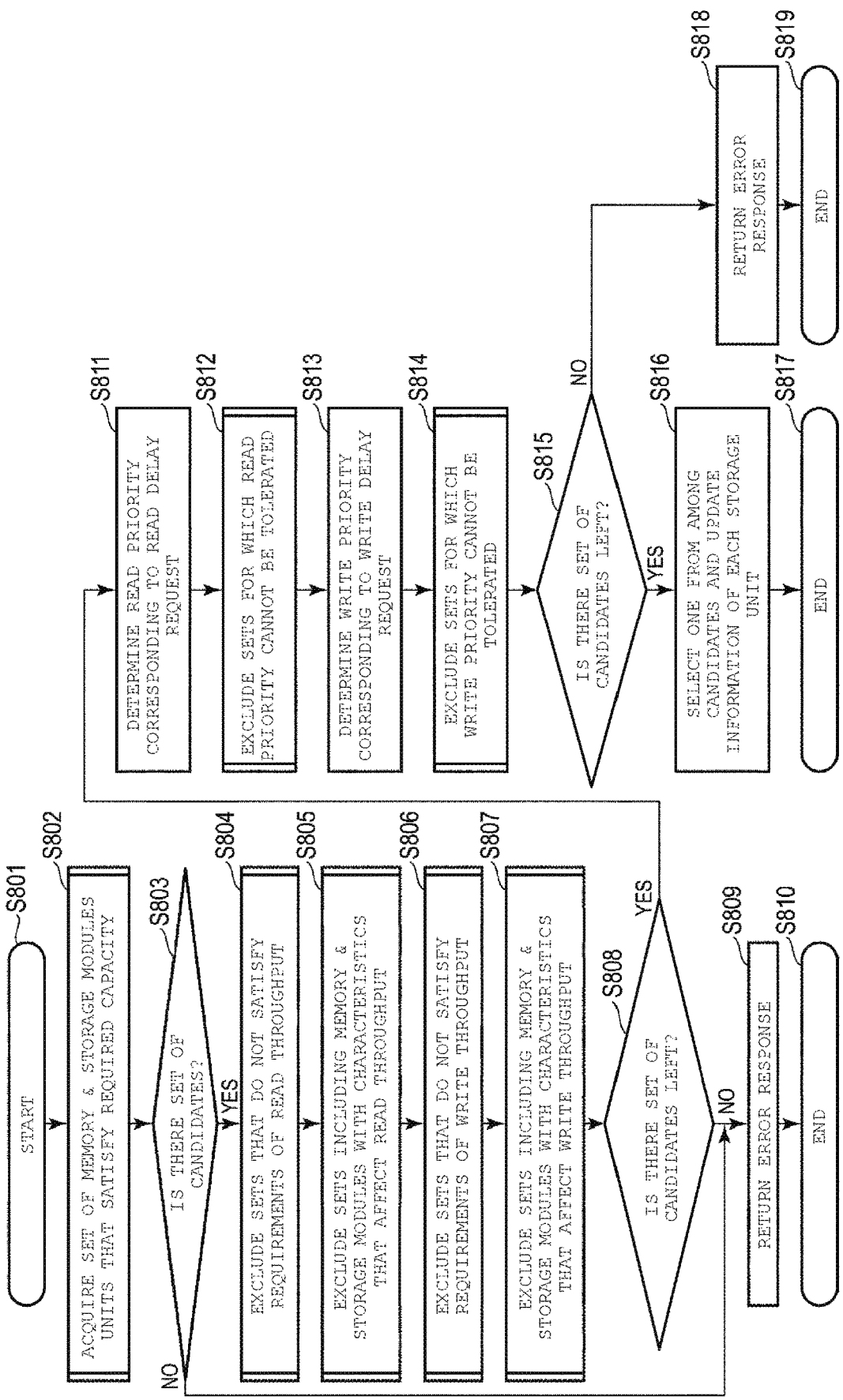
FIG. 8 is a flowchart showing a procedure for deriving internal QoS parameters in the memory and storage pool device.

A plurality of methods can be employed for deriving the internal QoS parameters. First, the simplest method will be described with reference to the flowchart of FIG. 8. The flow of FIG. 8 is executed after the derivation unit 108 reads the external QoS request stored in the QoS parameter storage unit 110 and the characteristic information stored in the monitoring result storage unit 111. It is assumed that the requested storage capacity needed to execute the algorithm of FIG. 8 is stored as one of the external QoS requests.

First, at S802, the derivation unit 108 calculates all combinations that satisfy the requested storage capacity. For example, in the configuration of FIG. 1, the derivation unit 108 checks the non-allocated capacity of the memory and storage modules 116 to 119 and obtains a set of combinations that satisfy the total capacity. Here, if there is no combination that satisfies the capacity (S803: NO), the derivation unit 108 returns an error response because the request cannot be satisfied (S809, S810).

If there is a combination that satisfies the capacity (S803: YES), the derivation unit 108 proceeds to the next step. The derivation unit 108 excludes combinations that do not satisfy the requirement for read throughput (LOAD throughput, READ throughput) from the combinations in the set (S804). The derivation unit 108 further refers to the characteristic information and excludes combinations including memory and storage modules having characteristics that may affect the read throughput (S805). The combinations remaining after the series of processes satisfy the read throughput requirement. Then, the derivation unit 108 likewise narrows down the narrowed down set that satisfies read throughput requirements to satisfy the write throughput requirement (S806, S807).

If no element remains in the set here (S808: NO), the derivation unit 108 determines that there is no area that can be allocated, returns an error response (S809), and ends the process (S810).

If elements remain in the set (S808: YES), the derivation unit 108 obtains the read priority that satisfies the read delay request (S811). Here, the specific method of setting the priority differs depending on the implementation. For example, two levels of priority, H and L, may be set, or eight levels of priority may be set using integers from 0 to 7. Here, the correspondence between external QoS requests and internal priorities is mechanically performed based on pre-defined relationships. If the number of classifications and ranking of the external QoS request and the number of classifications and ranking in the internal QoS control are the same as each other, the priority given as the external QoS request may be used as it is. If there is a difference, it is preferable that the correspondence is defined in advance such that the difference is as small as possible.

In addition to the correspondence described above, the superiority and inferiority relationship may be appropriately adjusted based on the priority allocated to the areas provided (allocated) by the memory and storage pool device 100. For example, it is assumed that the external priority is controlled in nine stages from 0 (high) to 8 (low), and the internal priority is controlled in three stages of High/Middle/Low, and that areas using High (external priority 2) and Middle (external priority 5) are already allocated. Here, it is assumed that a request of priority 3 is newly received. The result of mechanical conversion of the internal priority for priority 3 is Middle. As a result, since two Middles coexist in the memory and storage pool device 100, there is no superiority and inferiority relationship between external QoS requests. When the request is received, since only two areas are allocated in the memory and storage pool device 100, if appropriate adjustment is performed, three areas can be allocated while maintaining the superiority and inferiority relationship. That is, the priority of the area where Middle (external priority 5) is allocated is changed to Low (external priority 5), and Middle (external priority 3) is set for the newly received request. As such, by considering the priority of the areas already allocated to the memory and storage pool device 100, the internal priority may be relatively set to maintain the superiority and inferiority relationship of the external priority.

Then, the derivation unit 108 excludes combinations that do not satisfy the determined read priority (S812). For example, if a plurality of high priority areas are already allocated to the memory and storage module to be confirmed, the areas are excluded. Here, the specific number of high priority areas required to be excluded is adjusted according to the number of priority classifications and the storage medium of the memory and storage module to be used. In any case, it is adjusted such that higher-priority requests are not concentrated on a particular memory and storage module. Then, the derivation unit 108 processes the write priority in the same manner (S813, S814).

It should be noted that for the delay used for calculation by the memory and storage pool device 100 in determining the priority, the value specified in the external QoS request may be used as it is, or a value obtained by subtracting the internal transmission delay and the delay associated with reading and writing the memory and storage module may be used.

If elements remain in the set here (S815: YES), the derivation unit 108 may determine that there is an allocatable area. If a plurality of combinations remains, one combination is selected according to a predetermined condition, and the selected combination and the internal QoS parameters accompanying the same are stored in the QoS parameter storage unit 110 (S816, corresponding to S508 in FIG. 5A), and the process of deriving internal QoS parameters is ended (S817). If there are no possible combinations left in the set (S815: NO), the derivation unit 108 returns an error response (S818) and ends the process (S819).

The simplest method of deriving the internal QoS parameters of the memory and storage pool device 100 has been described above. Methods such as calculating the corresponding internal QoS parameters in advance for possible parameter combinations of external QoS requests and characteristic information, and selecting and applying a suitable one from among the parameters, and deriving a suitable combination of memory and storage modules and internal QoS parameters using machine learning, are conceivable.

FIG. 9 shows an example of obtaining a set of memory and storage modules that satisfies the required capacity described at S802 of FIG. 8. FIGS. 9A to 9D show examples of equally dividing and allocating the required capacity. The number of allocated memory and storage modules is varied between 4 and 1, and the numbers are selected according to the available capacity of each memory and storage module. If there is a clear shortage of capacity when S802 of FIG. 8 is executed, that combination is excluded.

For example, in the example of FIG. 9A, the memory and storage module 116 has 4 out of 10 capacity used, and in a similar fashion, the memory and storage module 119 has 7 out of 10 capacity used. Capacity 3 can be additionally allocated thereto. Meanwhile, in the example of FIG. 9B, the memory and storage module 119 cannot be allocated with capacity 4 because the remaining capacity is 3, but the capacity 4 can be allocated to the other memory and storage modules.

In the example of FIG. 9C, capacity 6 is allocated to the memory and storage modules 116 and 117 because the memory and storage modules 118 and 119 do not have sufficient capacity. If there is free capacity in the memory and storage modules 118 or 119, at S802 of FIG. 8, combinations such as (116, 118), (116, 119), (117, 118), (117, 119), and (118, 119) are also generated. Based on the same policy, even when only one memory and storage module is used, it is generated if possible.

FIG. 9E shows an example in which the required capacity is not divided equally. Usually when there is no information on the required capacity and its workload, if the capacity requested from the outside of the memory and storage pool device 100 is equally divided, it may be expected that access will occur equally to each memory and storage module. Therefore, in general, there is no need to generate a combination of capacity allocations with bias as shown in FIG. 9E. However, if certain hint information is given along with the capacity allocating request, it may be effective in some cases to unequally allocate the capacity as shown in FIG. 9E. The hint information in FIG. 9E indicates that the space A has a size of 2 and that about 50% of all accesses occur. Spaces B to D are the same. If the hint is used to generate a combination that evenly accesses the four memory and storage modules, as shown in FIG. 9E, space A is allocated to two memory and storage modules and space C is allocated to one memory and storage module. Space B and space D are collectively allocated to one memory and storage module.

If the required capacity is not equally divided as described above, the granularity of dividing the capacity greatly affects the number of candidates. For example, if allocation candidates are generated in units of 1 MB when a total allocation of 1 GB is requested, the number of candidates is too large. Therefore, an implementation restriction may be imposed such as generating candidates by varying the allocation amount in units of 10% of the required capacity, for example. As an example, for the allocation capacity of 1 GB accompanied by the hint information of FIG. 9E, the allocation candidates as shown in FIG. 9F may be generated in units of 100 MB, which is 10% of the allocation capacity.

As described above, when the allocation management function unit 103 receives a capacity allocating request (S502 in FIG. 5A), if the request does not include hint information for the allocated area, at S802, a combination that is equally divided as shown in FIGS. 9A to 9D may be generated, and if hint information is included, the hint may be used to generate a capacity allocation plan that does not equally divide, as shown in FIG. 9E.

FIG. 10 is a diagram showing an example of a method of allocating the throughput requested from outside of the memory and storage pool device 100 to the memory and storage modules 116 to 119 of the memory and storage pool device 100, when the read and write throughput is designated as the external QoS request.

Figure 10A:
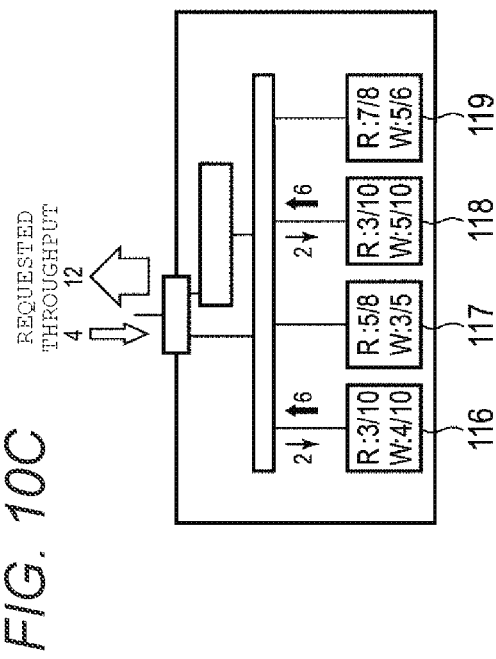
FIGS. 10A to 10D are diagrams showing an example of a method of allocating the throughput to the memory and storage modules of the memory and storage pool device in the memory and storage pool device.

FIG. 10A shows a case in which the throughput is equally allocated to the internal memory and storage modules. In the memory and storage module 116, when the allocated read throughput is 6 (the maximum amount is 10) and the allocated write throughput is 4 (the maximum amount is 10), read throughput 3 and write throughput 1 are newly assigned. FIG. 10A shows a case in which the external request throughput is divisible by the number of internal memory and storage modules, but if it is not divisible, the fraction (remainder after division) is added to one of the memory and storage modules or is allocated to the divisible number of memory and storage modules. For example, when the external QoS request has 3 writes and 12 reads, it is not divisible by 4, so it is allocated to 3 (FIG. 10B).

Figure 10C:
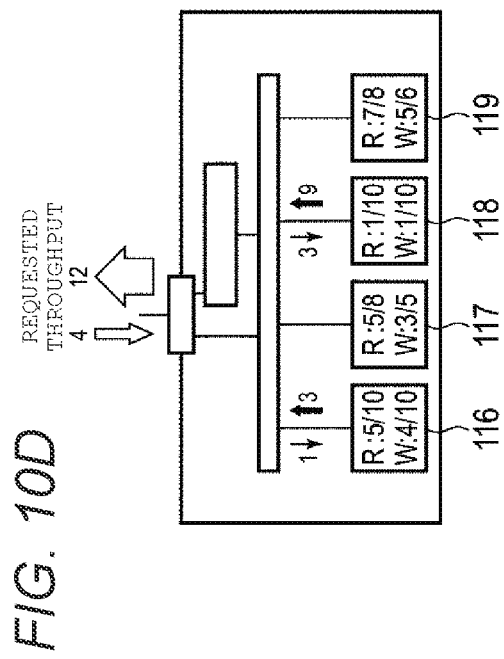
Figure 10B:
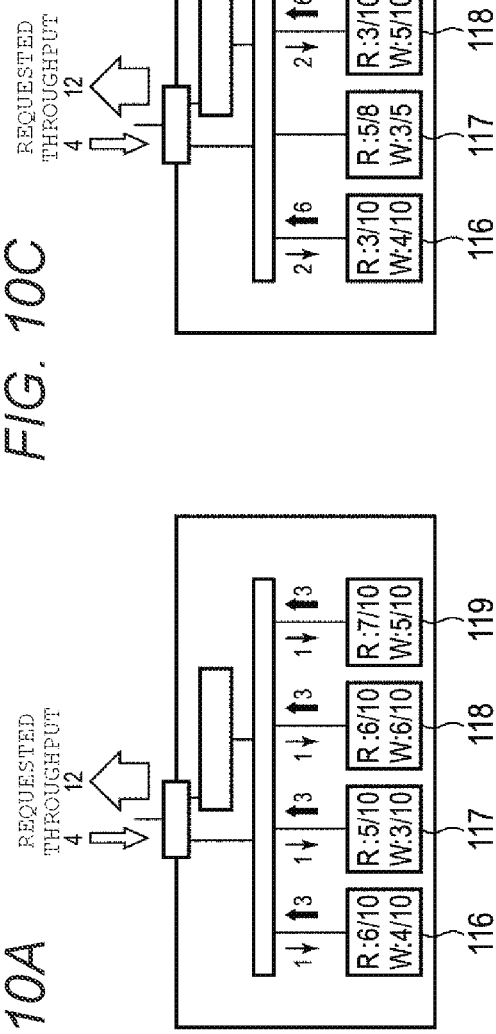
Figure 10D:
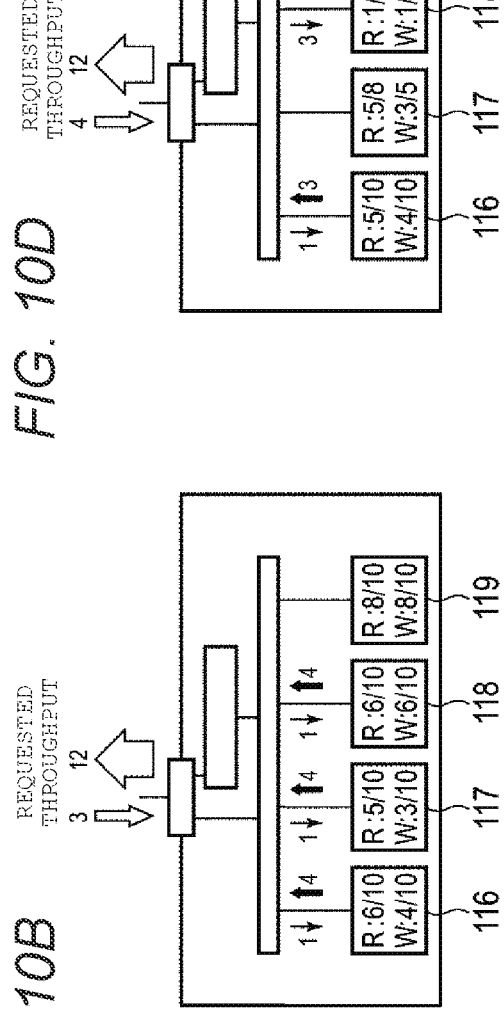

FIG. 10C is an example of equally dividing four units into two, and FIG. 10D is an example of uneven allocation. As in the example, even if the throughput of external QoS requests is divisible by the number of internal memory and storage modules, instead of assigning all memory and storage modules in the same way, it may be necessary to select which memory and storage module is to be allocated, based on certain criteria. For example, there may be times when there is no room for additional allocation due to already allocated throughput requests (corresponding to FIG. 10B, in which the value obtained by equally dividing the requested read throughput 12 by the number of modules is 3, but the remaining available throughput of the memory and storage module 119 is 2 such that it cannot be allocated and thus divided into three equal parts and allocated to the memory and storage modules 116 to 118), or when the performance of the memory and storage modules is uneven and the upper limit of the allocated throughput is different (corresponding to FIG. 10C, in which the performance of the memory and storage modules 117 and 119 is degraded, and it is not possible to additionally allocate the read throughput corresponding to one-fourth or one-third), or the like. The unequality in performance may be not only inherently determined (when memory and storage modules with different specifications are combined), but also posteriorly determined (when performance is degraded due to the deterioration of memory cells, and the like). These are appropriately detected by the operation of the monitoring function unit 106 and managed for derivation of internal QoS parameters.

FIG. 10D shows a state in which the performance of two memory and storage modules is degraded, and one of the remaining two has sufficient margin for throughput and the other does not. In this case, it is not possible to allocate the throughput in half, but it is possible to satisfy the request by the unequal allocation.

The examination of throughput allocation as described above is performed for the candidates generated at S802 of FIG. 8. For example, as shown in FIG. 9A, for a candidate for equally dividing the required capacity for all memory and storage modules, the throughput allocation method shown in FIG. 10A is a candidate, and the allocation methods shown in FIGS. 10B to 10D are not candidates. Likewise, for the assignment method shown in FIG. 9C, the allocation method as shown in FIG. 10C is a candidate.

In S805 and S807 of FIG. 8, the characteristic information stored in the monitoring result storage unit 111 is referred to, and candidates that may affect the read and write throughput are excluded, but the influence of characteristic information on throughput is supplemented hereinafter.

Among the characteristic information, one example of information that should be considered when determining throughput allocation is the execution frequency of garbage collection and wear leveling. When the values increase, the ratio of internal operations of the memory and storage module increases, and the time for executing read/write process from the outside decreases. Even when the non-allocated bandwidth remains, if the values tend to rise, the combination including the corresponding module from the memory and storage modules may be excluded. An increase in operating temperature may also affect throughput. In general, when the memory and storage module approaches the upper limit of the operable temperature, thermal throttling is activated and the operation is restricted. Therefore, the memory and storage modules that are constantly operating at high temperatures, and the memory and storage modules of which operating temperature tends to rise, are likely to be restricted by thermal throttling, so combinations including such memory and storage modules may be excluded.

Then, the assignment to the delay (priority) described at S811 to S814 of FIG. 8 will be supplemented hereinafter.

The memory and storage pool device 100 uses memory and storage modules such that areas having the same priority have the least overlap with each other as possible. As described above, the priority is expressed in the form of numerical values such as two values of high (1) and low (0) and eight levels of 0 to 7, but the allocation management function unit 103 may store and manage the information in the allocation information storage unit 112 as part of the allocation information. When allocating a new area, the stored information is referred to and inappropriate combinations are excluded.

The number of memory and storage modules to allocate the areas may be adjusted according to the priority. For example, if a high priority area is allocated across all memory and storage modules, the access to the corresponding area is likely to be blocked by the other high priority accesses. Therefore, among the combinations that satisfy the requirements for throughput, priority may be given to combinations with a small number of memory and storage modules that overlap with other areas, and combinations with many overlapping areas may be positively excluded. Likewise, to reduce the possibility that a low-priority area occupies a specific memory and storage module for a long period of time, combinations spanning a plurality of memory and storage modules may be prioritized and combinations with a low number may be positively excluded.

Figure 11A:
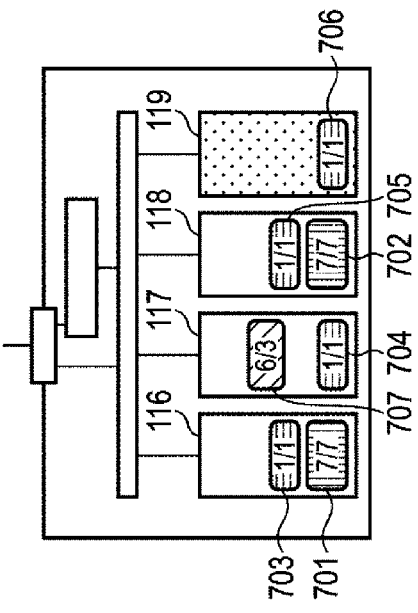
FIGS. 11A to 11D are diagrams showing an example of a method of allocating throughput to memory and storage modules based on priority in the memory and storage pool device.

FIG. 11A shows a state in which two areas with different priorities (area A including 701 and 702 and area B including 703 to 706) are already allocated. The area A has a priority of 7 for both reading and writing, and the area B has a priority of 1 for both reading and writing. Based on the above policy, the high priority area A is allocated to two fewer memory and storage modules, and the low priority area B is allocated to four memory and storage modules. Here, a small new area C having a read priority of 6 and a write priority of 3 is allocated. Since the area C is small, the area C may be stored in any free area in FIG. 11A. Accordingly, at S812 and S814 of FIG. 8, combinations allocated to the memory and storage module 116 or the memory and storage module 118 of FIG. 11A that has a higher priority than area C is excluded. The memory and storage module 117 or the memory and storage module 119 in FIG. 11A is already allocated with the area B, but the priority is low, so it is considered that the affect on the delay is small. FIG. 11B shows the result when the memory and storage module 117 is selected. A portion corresponding to the area C is allocated in the memory and storage module 117 as an area 707.

Figure 11C:
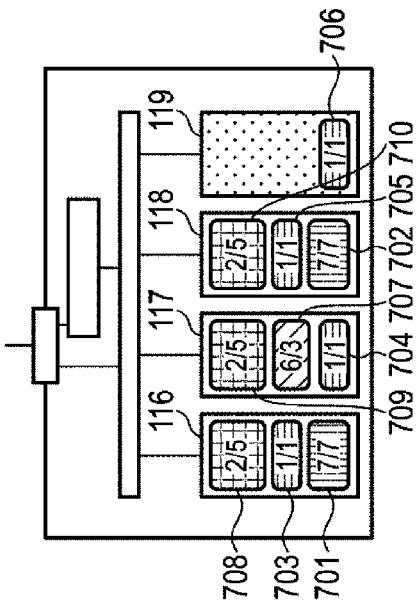
Figure 11B:
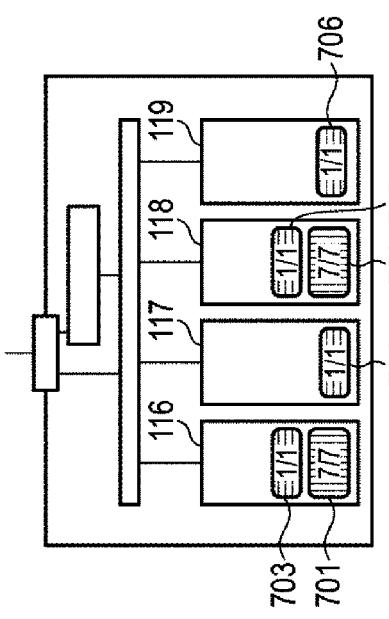
Figure 11D:
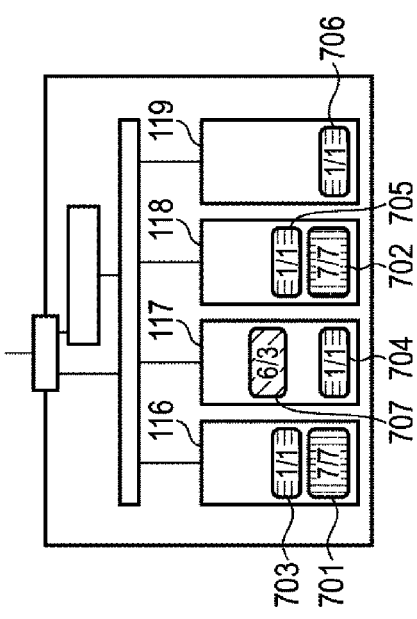

In the state of FIG. 11C, a case of allocating a relatively large area D (capacity required for about 3 memory and storage modules) with a read priority of 2 and a write priority of 5 may be considered. According to the algorithm of FIG. 8, combinations using three or more memory and storage modules should remain as candidates before execution of S811 of FIG. 8. That is, there is a possibility that combinations of (116, 117, 118), (116, 117, 119), (116, 118, 119), (117, 118, 119), (116, 117, 118, 119) remain. Here, it is assumed that as a result of referring to the information monitored by the monitoring function unit 106, an event that affects the write delay can be confirmed in the memory and storage module 119 (for example, the write delay is constantly increasing for some reason). As a result, the combination including the memory and storage module 119 is excluded at S814 of FIG. 8, and only the combination of 116, 117, and 118 remains. As a result, when the flow of FIG. 8 is executed, the area D is allocated as shown in FIG. 11D.

FIG. 12 shows an example of information stored in the QoS parameter storage unit 110 and referred to by the QoS control function unit 107. FIG. 12A is an example of a QoS request received from the outside of the memory and storage pool device 100, and the QoS control function unit 107 stores the information received from the outside as it is without changing the information. Here, four entries with seven items are listed. Each item is an identifier (No.) for identifying an entry, a priority for receiving traffic (IN priority), a delay for receiving traffic (IN delay), a bandwidth for received traffic (IN bandwidth), a priority for transmission traffic (OUT priority), a delay for transmission traffic (OUT delay), and a bandwidth for transmission traffic (OUT bandwidth). It should be noted that the QoS control function unit 107 may manage other items, in which case the items may be preferably added to the right side. For example, loss rate, error rate, and the like may be included (if such items are given, the internal loss rate and error rate may be set considering the required external loss rate and number of divisions).

If there is an external computing device that requires the number of internal divisions (e.g., the number of allocated memory and storage modules), the number of divisions may be stored.

Row 1201 in FIG. 12 is an entry corresponding to the first request, which is a request including all information of each item. Row 1202 in FIG. 12 is an entry corresponding to the second request, omitting the request for delay in both reception and transmission. Thus, QoS need not include all parameters, in which case it is expected to achieve the requested throughput while preserving priority with other co-existing traffic. Row 1203 in FIG. 12 is an entry corresponding to the third request, omitting requests other than bandwidth. Here, the priority may be controlled by assuming that a standard priority (4 for 8 levels from 0 to 7) is set. Specifically, the initial value of the priority to be allocated is a matter of design and implementation. Row 1204 in FIG. 12 is an entry corresponding to the fourth request, omitting parameters other than priority. Here, it is expected that the achievable delay and throughput are left to chance, and only priority control is performed when resources such as communication channels compete.

FIG. 12B is an example of internal QoS parameters generated by the QoS control function unit 107 of the memory and storage pool device 100. Basically there are items like the external QoS request, but there is no delay item. This is an example in which finely controlling the delay value in the memory and storage pool device 100 is determined to be difficult, so the delay item is not implemented. When an upper limit value of the delay is set and control is performed in such a way that internal communication data is discarded when the upper limit value is exceeded, the parameter of the delay may be stored as in FIG. 12A. Other items are the same as in FIG. 12A, but items with "IN" are items for commands and data received by the memory and storage modules 116 to 119 that form the memory and storage pool device 100, and are applied when commands and data received by the I/F unit 101 and subjected to operations such as address conversion are transmitted to the memory and storage modules 116 to 119 via the switch 115. Therefore, these parameters are notified to the switch 115 through the setting unit 109.

Meanwhile, "OUT" is an item for commands and data transmitted by the memory and storage modules 116 to 119. Therefore, the parameters stored in each item of "OUT" should be transmitted to each of the memory and storage modules 116 to 119 through the setting unit 109, and appropriately applied in each memory and storage module.

It should be noted that the band items are stored in bps in FIG. 12A and in % in FIG. 12B. Either may be used for management, and which is selected is a matter of design.

The memory and storage pool device 100 according to the first embodiment has been described in detail above. By providing the monitoring function unit 106 that monitors the internal usage and operation states, the monitoring result storage unit 111 that stores the monitoring results, and the QoS control function unit 107 that derives the internal QoS parameters based on the external QoS requests and the monitoring results the memory and storage pool device 100 according to the first embodiment can operate to satisfy the external request, achieving more reliable QoS control.

Second Embodiment

Next, a second embodiment will be described. The second embodiment is an extension of the first embodiment. In the first embodiment, once set, the internal QoS parameters continue to be applied without being changed until invalidated. In contrast, in the second embodiment, when a new external QoS request is received, the previously set internal QoS parameters are readjusted to facilitate responding to the new request. It should be noted that the functional block diagram of the memory and storage pool device 100 according to the second embodiment is the same as that of the first embodiment (refer to FIG. 1).

Figure 13A:
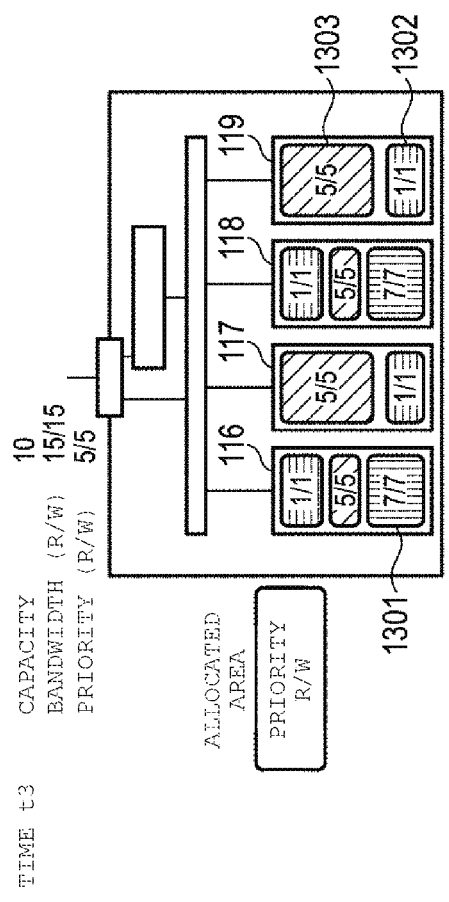
FIGS. 13A and 13B are diagrams showing an example of readjusting internal QoS parameters in a memory and storage pool device according to a second embodiment.

In describing the second embodiment, it is assumed that the situation shown in FIG. 13A is the initial state of the memory and storage pool device 100. Here, one or two areas are allocated to each of the memory and storage modules 116 to 119. An area 1301 (in vertically striped pattern) is an area allocated to two memory and storage modules upon receiving a request at time t1, and an area 1302 (in horizontal striped pattern) is an area allocated to two memory and storage modules upon receiving a request at time t2. Each external request has (capacity 6, R band 6, W band 12, R priority 7, W priority 7) and (capacity 4, R band 4, W band 4, R priority 1, W priority 1). Since the minimum allocation unit of an area is 2 units, 4 units are allocated to the actual capacity of 3 for the area 1301.

It is assumed that a new external request is received at time t3. The external request Q has parameters of (capacity 10, R bandwidth 15, W bandwidth 15, R priority 5, W priority 5). According to the algorithm of FIG. 8, possible combinations of area allocation are generated first, but since the total remaining capacity is 8 in the initial state, there is not enough remaining capacity to accept the request. However, noting that the total capacity of external requests in the initial state is 14, 16 is allocated to the actual required capacity of 14. If the capacity allocation unit can be changed to 1 unit, the surplus areas can be allocated to new requests and new requests can be accepted. In the second embodiment, when such a situation can be detected during execution of the allocation algorithm, new requests may be accepted by changing the allocation unit or adjusting the allocated capacity or bandwidth.

Figure 13B:
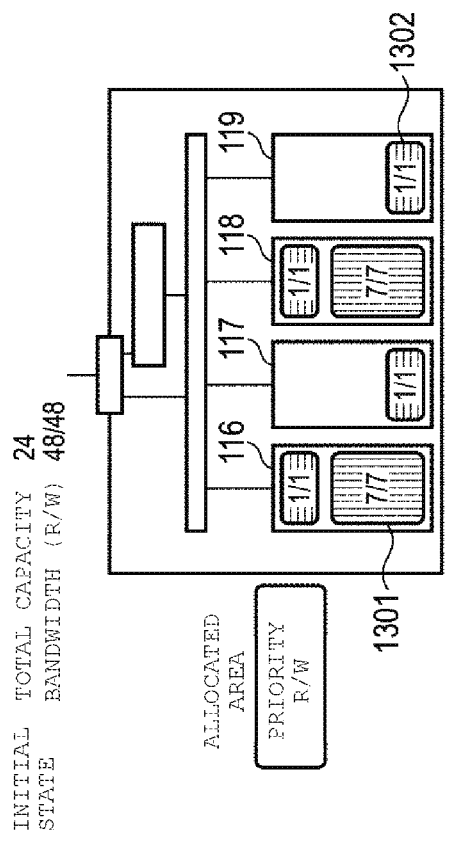

FIG. 13B is an operation example when the capacity allocation unit is changed to 1 unit and an external request Q is received. By changing the allocation unit to 1 unit, the 2 capacities excessively allocated to the area 1301 are extracted. Since the area extracted here is an over-allocated area due to the circumstances of the memory and storage pool device 100, it is not used by the external computer to be allocated (the external computer is not notified of the allocation). Therefore, the area may be simply scaled down.

Since all remaining capacity is required to allocate capacity 10 to each memory and storage module, the combination of capacities generated according to the algorithm of FIG. 8 is one of (1, 4, 1, 4). Next, inappropriate combinations can be excluded based on throughput (bandwidth) requirements, but since there are no factors affecting throughput here, the process proceeds to the next step. In the same way, the priority (delay) is determined and it is confirmed that there are no factors affecting the priority. Finally, the allocation of the area is (1, 4, 1, 4), and the R band and W band may be allocated as (3, 9, 3, 9).

In the example, although the allocation unit for capacity is changed, if there is excessive bandwidth allocation and it is possible for the memory and storage modules 116 to 119 and the switch 115 to respond to bandwidth control in finer units, the bandwidth allocation unit may be changed.

Figure 14:
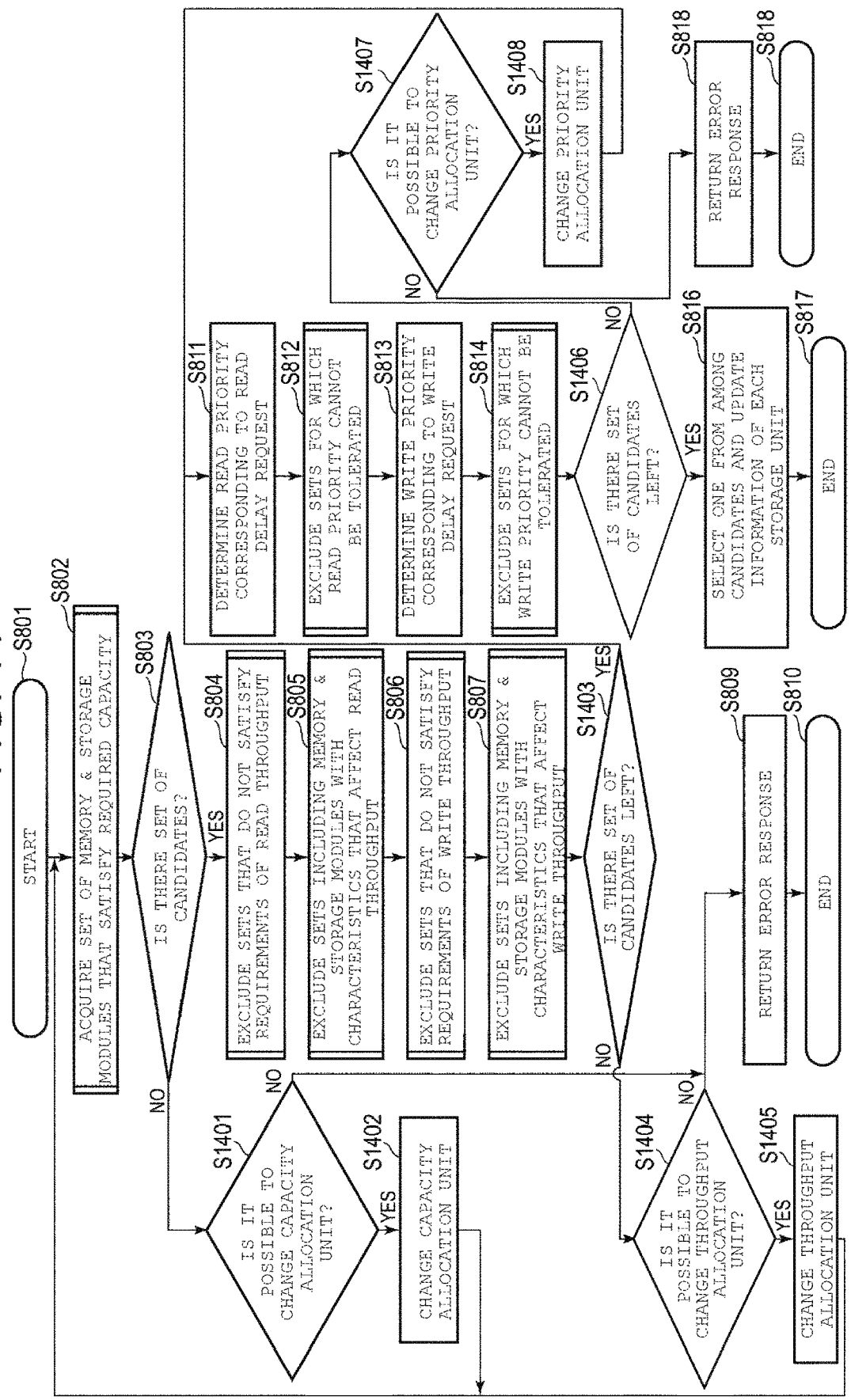
FIG. 14 is a flowchart showing a procedure for deriving internal QoS parameters in the memory and storage pool device according to the second embodiment.

FIG. 14 is a flowchart showing the procedure for deriving internal QoS parameters in the memory and storage pool device 100 according to the second embodiment. Steps for changing the allocation unit (S1401 to S1402, S1404 to S1405, S1407 to S1008) are added to the flowchart in the first embodiment shown in FIG. 8. Since management in a large unit is considered to have less overhead than management in a small unit, the "change" described in the flowchart is generally a reduction in the management unit. However, the management unit may be expanded for some reason. In the flowchart, when the allocation unit of capacity and throughput is changed, the process returns to the first step (S802), and when the priority (delay) is changed, the process returns to the priority determination step (S811). This is because bandwidth and throughput are parameters that may be correlated to each other, and priority (delay) is a parameter that may be controlled somewhat independently. The process may be implemented to return to the first step even when the management unit of the priority (delay) is changed.

The memory and storage pool device 100 according to the second embodiment has been described above. In the already allocated area, by reviewing the management unit for excessively allocated resources (capacity, bandwidth, priority) and reviewing the excess amount, more appropriate internal QoS parameters are derived.

Third Embodiment

Next, a third embodiment will be described. The third embodiment is similar to the second embodiment, but is different in point of view. In the second embodiment, the internal QoS parameters are changed by changing the allocation unit in the memory and storage pool device 100. In the third embodiment, a difference between the monitoring results of monitoring the allocated area by the monitoring function unit 106 and the external QoS request is detected, and based on the monitoring results, an attempt is made to change the internal QoS parameters.

Figure 15:
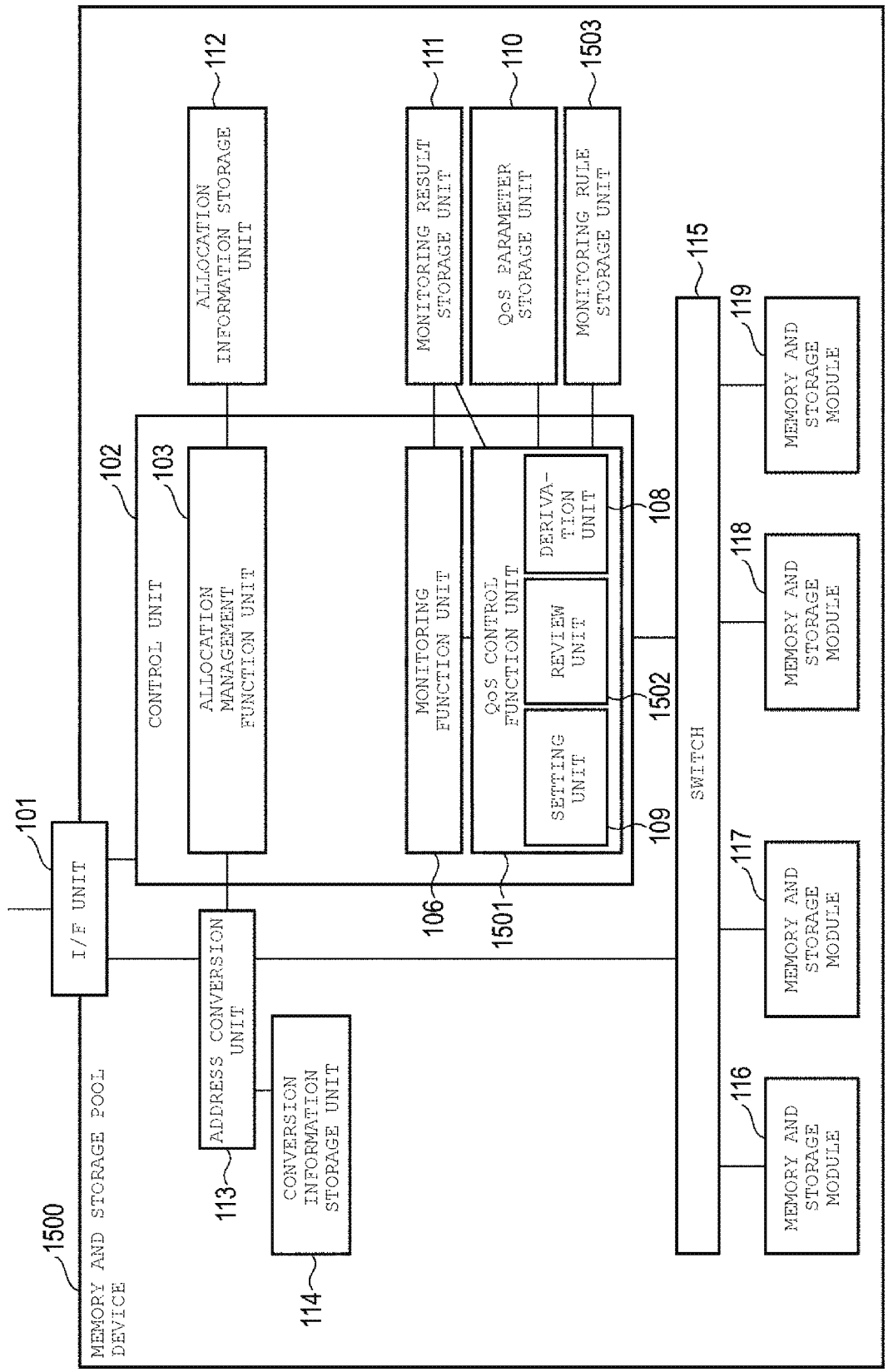
FIG. 15 is a diagram showing a configuration example of a memory and storage pool device according to a third embodiment.

FIG. 15 is a functional block diagram of a memory and storage pool device 1500 according to the third embodiment. The functional block diagram of the memory and storage pool device 1500 is obtained by modifying the functional block diagram of the memory and storage pool device 100 according to the first embodiment (refer to FIG. 1). A monitoring rule storage unit 1503 is added, and also a review unit 1502 having a function of reviewing existing internal QoS parameters according to review conditions stored in the monitoring rule storage unit 1503 is added to a QoS control function unit 1501. Different reference numerals are given to the memory and storage pool device and the QoS control function unit because the internal parts are changed.

Figure 16A:
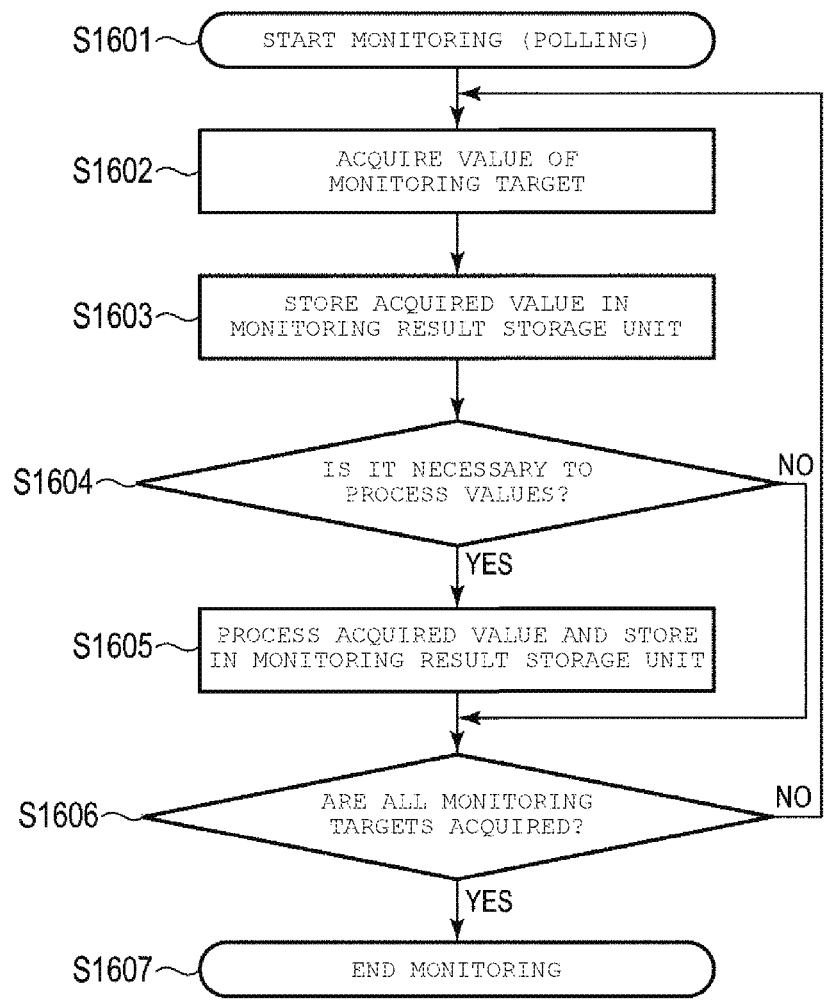
FIG. 16A is a first flowchart showing a monitoring operation in the memory and storage pool device according to the third embodiment.
Figure 16B:
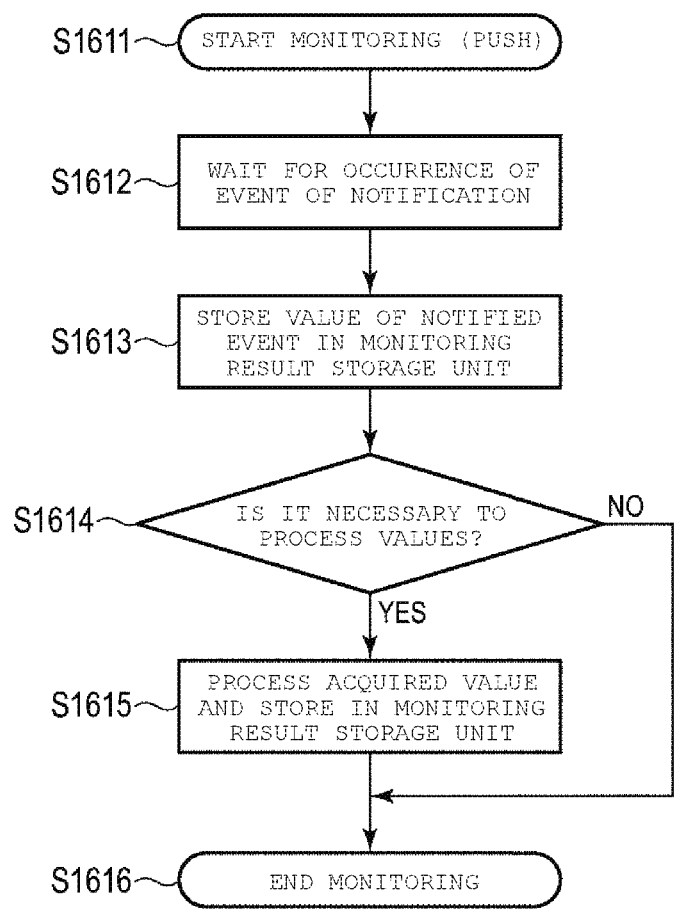
FIG. 16B is a second flowchart showing the monitoring operation in the memory and storage pool device according to the third embodiment.
Figure 16C:
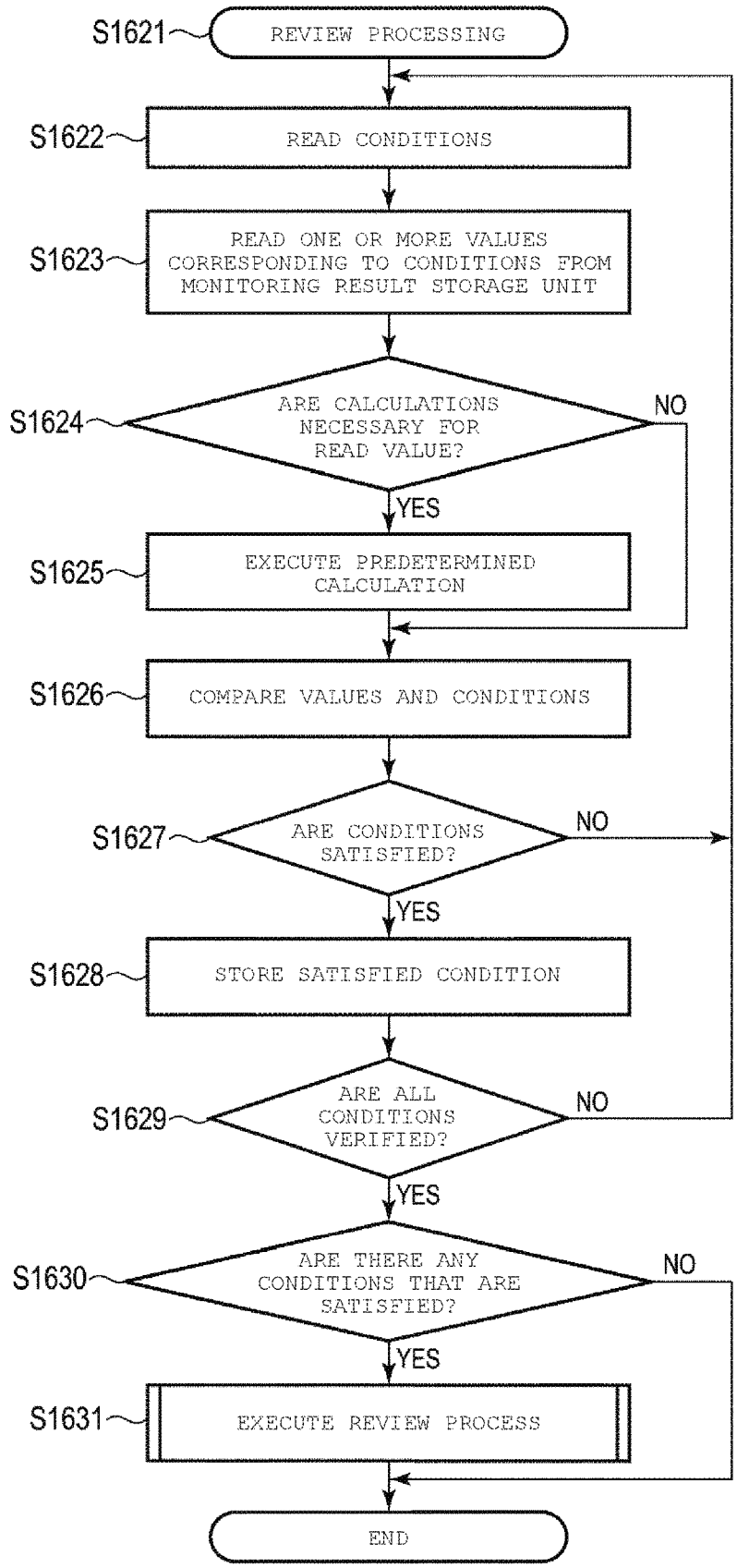
FIG. 16C is a flowchart showing a review operation of internal QoS parameters in the memory and storage pool device according to the third embodiment.

FIGS. 16A and 16B are flowcharts relating to the monitoring operation performed by the monitoring function unit 106 in the memory and storage pool device 1500 according to the third embodiment. FIG. 16C is a flowchart relating to the internal QoS parameter review operation performed by the review unit 1502 of the QoS control function unit 1501 in response to the monitoring results of the monitoring function unit 106.

As mentioned above, the monitoring function unit 106 performs monitoring by two methods: polling type monitoring in which values are acquired by periodically checking a monitoring target, and push type monitoring in which values are acquired when a monitoring target event occurs. FIG. 16A shows polling type monitoring, and FIG. 16B shows push type monitoring. In the case of the polling type monitoring shown in FIG. 16A, the monitoring targets are stored in the monitoring rule storage unit 1503 in advance through S1601-1603, and the flow includes iteration of steps S1602-S1606 to acquire the monitoring targets in order. In the case of the push type monitoring shown in FIG. 16B, only the value that is the target of the event is acquired through S1611-1613, so iteration does not occur in principle. It is assumed that there is no difference in other parts, and the content of processes to be performed at S1605 and S1615 is determined for each monitoring. The content of processes may be stored fixedly by the monitoring function unit 106, or may be stored as a process rule in the monitoring rule storage unit 1503 together with the monitoring target list. In either case, the monitoring results are stored in the monitoring result storage unit 111 together with the monitoring time.

The review process of FIG. 16C is triggered by the monitoring process of the monitoring function unit 106. Since the monitoring process is executed periodically, the review process is also executed periodically. In the review process, the review conditions stored in the monitoring rule storage unit 1503 are referenced (S1622), and the monitoring results necessary for determining the conditions is read out from the monitoring result storage unit 111 (S1623). In some cases, the read values cannot be compared with the review conditions as they are, and certain calculations may be required for comparison. Whether the calculation is necessary is stored together with the review condition, and the review unit 1502 sequentially determines whether calculation is necessary at a timing of reading the values (S1624). If the calculation is necessary (S1624: YES), the review unit 1502 performs the calculation specified by the review conditions (S1625). When the monitoring results necessary for the calculation is insufficient, the review unit 1502 may be executed at the timing when the monitoring is complete (although not shown in the flowchart of FIG. 16C). After a series of preparations is completed, the review unit 1502 determines whether the review condition is satisfied based on the read value (S1626). If the conditions are satisfied (S1627: YES), the review unit 1502 determines whether all the conditions are verified (S1629). If there is an unverified condition (S1629: NO), the process by the review unit 1502 returns to S1622.

If there is no unverified condition (S1629: YES), the review unit 1502 determines whether there is a satisfied condition (S1630). If so (S1630: YES), the review unit 1502 executes the review process (S1631). If not (S1630: NO), the review process ends without executing the review process (S1632).

The general flow of the review process has been described above. As described above, it is possible to monitor various information related to the memory and storage modules, switches, and network I/F that form the memory and storage pool device 1500, and determine whether it is necessary to review the internal QoS parameters according to preset review conditions. As a result, even if the operating characteristics in the memory and storage pool device 1500 change from when the internal QoS parameters were set, it is possible to confirm the change and reset the parameters to the most appropriate parameters possible.

FIG. 17 is a diagram showing an example of a monitoring target list stored in the monitoring rule storage unit 1503. One row stores one rule, and FIG. 17 shows an example of six rules. No. field is a number given for convenience, and is unnecessary when it is stored in the monitoring rule storage unit 1503. Target element field is the component of the memory and storage pool device 1500 that is the target of monitoring. "M1" represents the first one of the memory and storage modules 116 to 119. Metrics field specifies the monitoring target metrics that can be acquired from the component specified in the target element field. Monitoring method field specifies the method for acquiring the value of the target metric to be monitored. Monitoring interval field specifies the interval at which polling is executed. Process rule field describes rules for processes to be performed when storing the acquired monitoring value in the monitoring result storage unit 111.

Row 1701 indicates that the total number of writes in the first memory and storage module is acquired by polling at intervals of 60 seconds. "-" is marked in the process rule, which means that no process is made. Row 1702 indicates that a write failure event in the first memory and storage module is detected by push notification. "-" is marked in the monitoring interval for the monitoring by the push notification. Since there is no need to process the storage of the events that occurred in particular, "-" is also marked in the process rule.

Row 1703 indicates that the first port of the switch is to be monitored and the total number of transmitted bytes is acquired by polling at 15-second intervals. Row 1703 has a different monitoring interval from Row 1701, and the monitoring interval may be set to different values for each target element/metric. Like Row 1703, Row 1704 monitors the first port of the same switch, but "3" is set for the monitoring method and "-" is set for the monitoring interval. This means that the same values are monitored in the third rule. "Delta (prev)" is specified as the process rule. This indicates calculating and storing a difference from the previous monitoring value. Rows 1705 and 1706 describe similar rules for the second port of the switch.

Here, as the process rule, although an example of calculating the difference from the immediately preceding value is described, a rule of calculating using a plurality of values may be described. For example, the average value may be calculated using three values including values observed from two previous times, and a value observed immediately previously.

A rule may be generated to generate a new value by performing certain calculation on a plurality of monitoring results. For example, Row 1706 describes a rule for calculating the total number of bytes transmitted by the switch by summing the total number of bytes transmitted by each port (although FIG. 17 only describes a rule that refers to the first port, it is assumed that other ports are described in the same way).

FIG. 18 is a diagram showing an example of review conditions stored in the monitoring rule storage unit 1503. As in the example of the monitoring target list, one rule is configured per line. No. field is numbered for convenience. Target element field is a component related to metrics required for condition determination. Required metrics field is monitoring metrics that are required for determining review conditions. The metrics described in the field needs to be provided in the monitoring target list described in FIG. 17. A plurality of metrics required for determination may be described in the field. Review condition field is a condition for determining the necessity of review using the field to be described in the required metrics. Although the review condition field is described in natural language in FIG. 18, the review condition field is actually stored in a form that may be handled by a computer. Threshold field is a value to be compared when determining whether the review condition is satisfied. In FIG. 18, it is described in a form such as TWE count, but actually a suitable numerical value is stored. Calculation rule field describes calculations required as pre-processing when review conditions using the metrics described in the required metrics field is determined. Like the review condition field, the calculation rule field is described in natural language, but actually, the calculation rule field stores a program fragment that implements a formula executable by the review unit 1502 or an address of a location where the program fragment is stored.

Row 1801 is an example without calculations. When the number of times an error occurs during writing exceeds a predetermined threshold, it is determined that the characteristics of the corresponding module from the memory and storage modules deteriorated, and a review is performed. Here, the monitored values are compared as they are. It should be noted that the target element "M*" in the row represents any memory and storage module.

Rows 1802 to 1807 are examples involving calculations. Row 1802 handles write errors in the same way as in Row 1801, but since the occurrence interval is a condition, calculation is performed to obtain the occurrence interval from the time when the storage error occurs. Likewise, Rows 1803 to 1807 define rules for performing calculations on the monitored simple metrics and changing them into forms necessary for conditional determination. "SW.p*" in the target element of Row 1807 represents any connection port of the switch.

If the review condition described above is satisfied, the review unit 1502 performs the review process on the applied internal QoS parameters. The review process is first performed from possible priority changes in a manner that maintains the allocation of memory and storage modules. It is possible to cope with cases in which priority control does not work well due to competing requests for a plurality of areas allocated with the same priority, and cases in which priority needs to be reviewed due to a change in allocation status after deriving internal QoS parameters. In situations where error correction code or mirroring is applied, only the priority for memory and storage modules storing redundant data, not the data itself, may be adjusted. In the case of the area to which the error correction code is applied, priorities may be adjusted so that there are the memory and storage modules with the smallest number of high priority that can be read normally in the range of predictable correction capability and the memory and storage modules having a higher priority than that.

Next, the review unit 1502 performs a review that cannot be handled only by reviewing the priority, but can be handled without moving the stored data. Specifically, the review includes a change of write destination when a new write request occurs, a change of the error correction code that involves a change of redundancy, a change of mirroring destination, and the like. The change of the error correction code may increase or decrease the amount of redundant data, resulting in a change of the necessary allocation amount and a change of the write destination. When the mirroring destination is changed, the amount of redundant data is not changed, but the location where newly stored data is stored is changed. Such changes are handled by applying different address conversion rules to the areas before and after the review.

That is, when the review unit 1502 performs the determination described above, the allocation management function unit 103 allocates the corresponding area and notifies the address conversion unit 113 to generate a new conversion rule for the same. The address conversion unit 113 generates a new conversion rule and stores the conversion rule in the conversion information storage unit 114 in a manner of adding the new conversion rule to the existing conversion rules.

The review may be implemented such that, when the data stored in the old area is deleted before it is moved, the area used by the deleted data is not moved, and the new area that follows the reviewed allocation and conversion rules is used directly. Therefore, the address conversion unit 113 may have a function of managing whether the process of invalidating the old area is executed, and replacing the rules to correspond to the new area after invalidation.

Finally, the review unit 1502 performs a review that requires movement of the data that is already stored in the memory and storage module before and after the review. The review should not be done frequently as data movement has a significant affect on the process of the other areas, but the review may be executed when the high priority READ/LOAD requests are concentrated on a specific memory and storage module, making it impossible to satisfy the external QoS request.

There are roughly three manners for the method of moving the stored data by the review. The method in the first manner is performed when a READ/LOAD request to the movement source occurs. The control unit 102 controls such that the stored data read by the READ/LOAD command is returned as a response and stored in a new area. When the storage is completed, the conversion table is rewritten to refer to the new area by the functions of the allocation management function unit 103 and the address conversion unit 113. The method in the second manner is performed when a WRITE/STORE request to the movement source occurs. The control unit 102 controls such that the corresponding portion of the old area specified by the store destination address and length of the WRITE/STORE command is invalidated and stored in the new area. When the storage is completed, the conversion table is rewritten to refer to the new area by the allocation management function unit 103 and the address conversion unit 113. The method in the third manner is performed when no process is occurring for the memory and storage module including the area to be moved. For the purpose of achieving a movement that accompanies the review, the control unit 102 controls such that READ/LOAD commands are issued for data in the old area, and WRITE/STORE commands are issued to store the results in the new area. When the storage is completed, the conversion table is rewritten to refer to the new area by the allocation management function unit 103 and the address conversion unit 113.

The memory and storage pool device 1500 according to the third embodiment has been described above. By detecting a difference between the monitoring results of monitoring by the monitoring function unit 106 and the external QoS request for the allocated area and attempting to change the internal QoS parameters based on the detected difference, a more appropriate internal QoS parameter is derived.

Fourth Embodiment

Next, a fourth embodiment will be described. In the first to third embodiments, the monitoring results of monitoring by the monitoring function unit 106 are used for deriving and reviewing the internal QoS parameters. Here, the possibility of a potential failure in the memory and storage module is not considered. In the fourth embodiment, a method of predicting potential failures from monitored information, receiving notification of a failure, and responding to the potential failure will be described.

Figure 19:
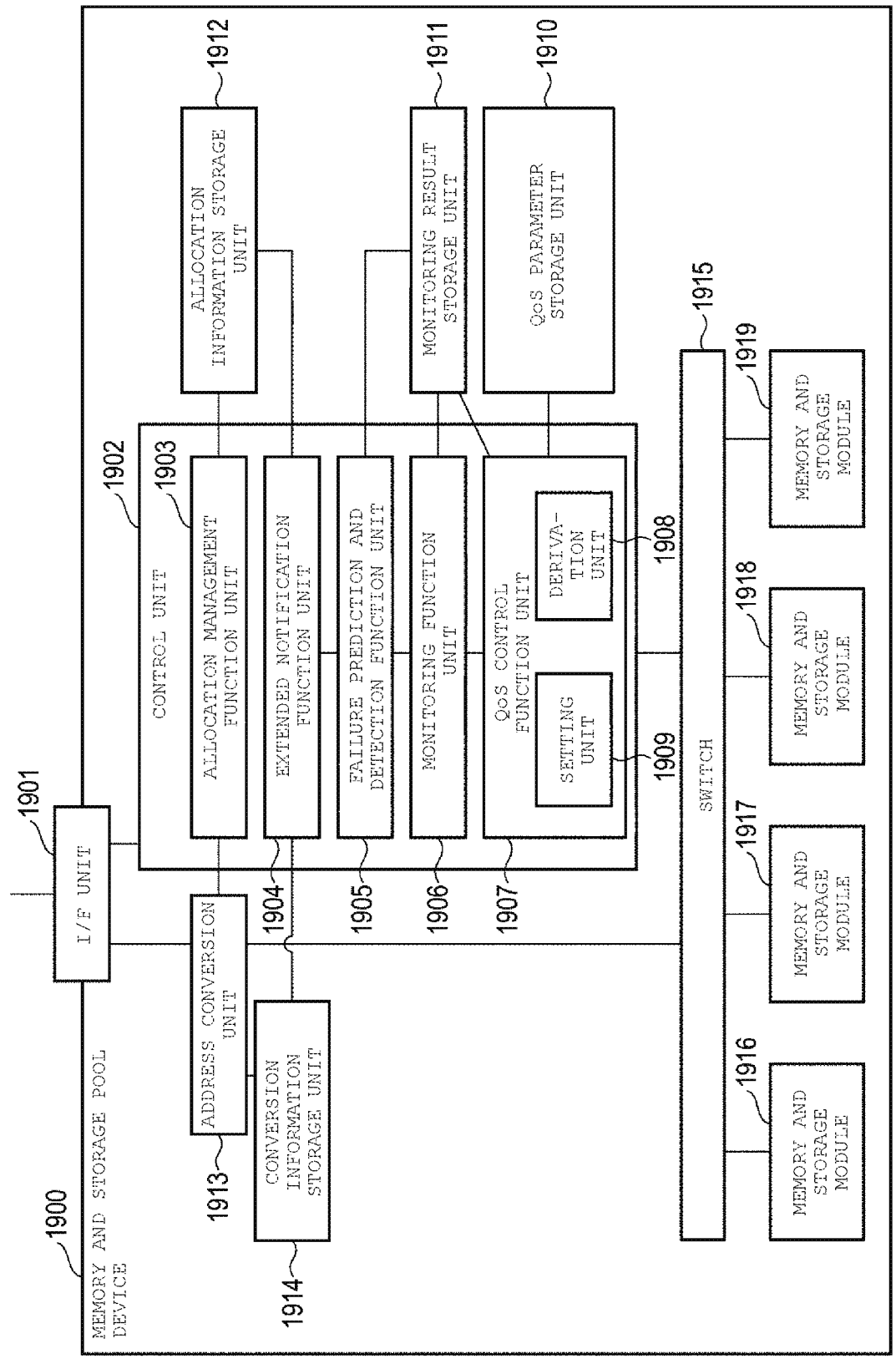
FIG. 19 is a diagram showing a configuration example of a memory and storage pool device according to a fourth embodiment.

FIG. 19 is a functional block diagram of the memory and storage pool device according to the fourth embodiment. In the drawing, new reference numerics are also assigned to functional elements having the same functions as those of the first to third embodiments. In FIG. 19, the failure prediction and detection function unit 1905 and an extended notification function unit 1904 are added.

The failure prediction and detection function unit 1905 has a function of determining whether there is a possibility that a failure will occur in the memory and storage module based on the monitoring results by a monitoring function unit 1906 and stored in a monitoring result storage unit 1911, and based on failure notification and a function of detecting failures. Here, "prediction" means performing certain statistical process with respect to the monitoring results, estimating changes in metrics in the future, and determining that there is a high possibility that a failure will occur. The conditions for determining that the possibility is high may include, when a pre-learned failure occurrence prediction model may be applied to one or more monitoring values that exceed a predetermined threshold value when extrapolated against time-series changes in one or more monitoring values, the output possibility of failure occurrence exceeds a predetermined threshold value, and the like. It is assumed that the threshold value and the failure occurrence prediction model are set in advance for a memory and storage pool device 1900 and appropriately stored.

The extended notification function unit 1904 has a function for notifying the external computing device using the memory and storage pool device 1900 of the possibility of occurrence of a failure or a detected failure. However, the extended notification function unit 1904 does not simply notify the possibility of failure or the occurrence of failure, and has a function of specifying tasks (e.g., programs) on an external computing device that use areas allocated to memory and storage modules that are likely to fail or that failed, by referring to the allocation information stored in an allocation information storage unit 1912 and notifying the external computing device of a notification including the identifier of the task.

Figure 20:
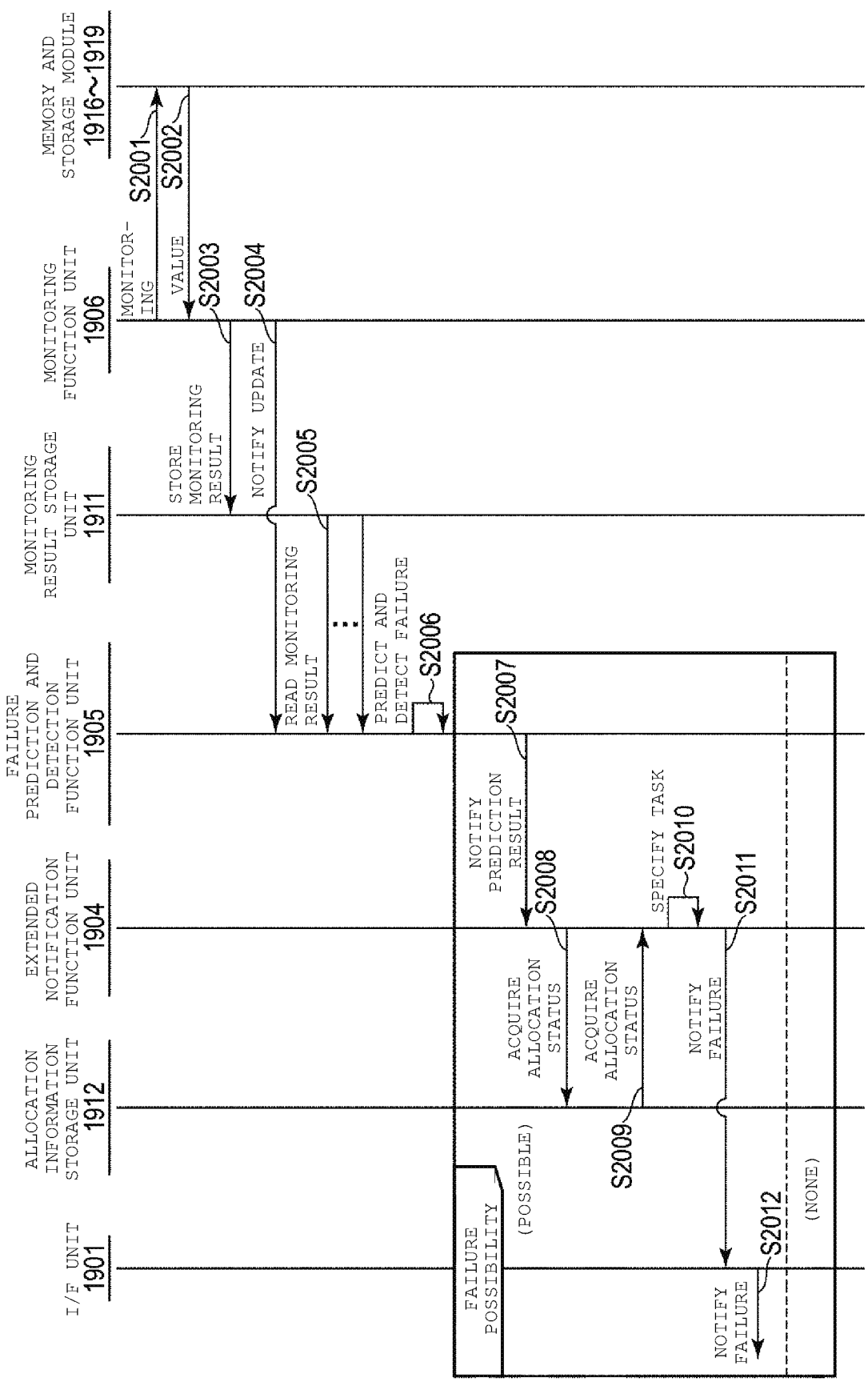
FIG. 20 is a sequence diagram showing a flow of predicting and detecting a failure in the memory and storage pool device according to the fourth embodiment.

FIG. 20 is a sequence diagram corresponding to functions added in the fourth embodiment. The monitoring function unit 1906 monitors the memory and storage modules 1916 to 1919, acquires the values of monitoring target metrics (S2001, S2002), and stores the values in the monitoring result storage unit 1911 (S2003) in the same manner as in the first to third embodiments. When periodic polling monitoring is completed or when notification is received by push monitoring, the monitoring function unit 1906 notifies the failure prediction and detection function unit 1905 that the monitoring results stored in the monitoring result storage unit 1911 is updated.

Upon receiving the notification, the failure prediction and detection function unit 1905 reads, from the monitoring result storage unit 1911, the monitoring results necessary for comparison with a predetermined threshold value or the monitoring results to be applied to a preset failure occurrence prediction model (S2005). Then the failure is estimated or detected according to the method described above (S2006).

When it is determined that there is a possibility of failure as a result of estimation or detection, the failure prediction and detection function unit 1905 performs process to notify the estimation result. First, the failure prediction and detection function unit 1905 notifies the extended notification function unit 1904 of the estimation result (S2007). The notification includes the identifier, address and range of the memory and storage module determined to have the possibility of failure, the type of failure, the severity of the failure, and the like. Upon receiving the notification, the extended notification function unit 1904 acquires the allocation information stored in the allocation information storage unit 1912 based on the identifier of the memory and storage module with the possibility of failure (S2008, S2009), and specifies tasks using the affect range of the memory and storage module (S2010).

After the task is specified, the extended notification function unit 1904 transmits a failure notification including the task identifier to the external computing device in which the task is executed (orchestrator when tasks running on an external computing device are under integrated control by a device that controls a group of computers called an orchestrator) (S2010, S2011).

Although it is outside the operating range of the memory and storage pool device 1900, an external computing device that receives the notification described above may confirm the content of the notification and take countermeasures, such as temporarily suspending the affected task or moving the affected task to another computing device. In particular, when tasks running on external computing devices are integrally controlled by the orchestrator, after receiving the notification, the orchestrator may request the memory and storage pool device 1900 to allocate a new memory and storage area for use in the same task, and may control the task to be executed as a separate task.

As described above, the failure prediction and detection function unit 1905 is activated at the timing of receiving a notification from the monitoring function unit 1906 (S2004), and the monitoring function unit 1906 notifies as a result of periodic polling type monitoring or push type monitoring from internal components such as memory and storage modules and switches.

It is not necessary to fix the monitoring interval for the periodic polling type monitoring. For example, the monitoring interval may be adjusted according to the load status of the memory and storage pool device 1900 and each memory and storage module (if the load is high, increase the monitoring interval not to interfere with process, and if the load is low, decrease the monitoring interval, and the like). The monitoring interval may be adjusted according to the monitoring value or the possibility of failure calculated by the failure prediction and detection function unit 1905. For example, adjustments such as shortening the monitoring interval when it is determined that there is an upward trend in the monitoring value leading to failure, and shortening the monitoring interval when it is determined that there is a high possibility of occurrence of failure are possible.

Meanwhile, in some cases, an event that triggers push-type monitoring may be set on the memory and storage module side or the switch side. The setting may be used to predict the occurrence of a failure more efficiently.

For example, when the failure prediction and detection function unit 1905 calculates the failure occurrence possibility, it is assumed that the notification threshold value is not exceeded, but a minute change leading to the occurrence of a failure may be found. Here, the parameters related to the occurrence of the next event may be adjusted to make the event easy to occur. The event generation interval for another monitoring target may be adjusted according to a change in a certain monitoring value. For example, as the degree of fatigue of the memory and storage module increases, the threshold for the number of error occurrences for generating an event may be decreased. If it is possible to control the monitoring value to be notified accordingly when an event occurs, a plurality of monitoring values determined to be correlated by the process of the monitoring function unit 1906 and the failure prediction and detection function unit 1905 may be set to be notified at the same time. For example, the monitoring values are the degree of deterioration of the memory and storage module and the number of correctable errors accompanying reading and writing.

The functions may be implemented by cooperation between the failure prediction and detection function unit 1905 and the memory and storage module control function unit (not shown) of a control unit 1902.

The memory and storage pool device 1900 according to the fourth embodiment has been described above. The memory and storage pool device 1900 according to the fourth embodiment includes a function of monitoring the use and operation states and characteristics of the memory and storage modules and switches by the monitoring function unit 1906, and predicting the occurrence of failures and detecting failures based on the monitoring results, and a function of specifying tasks that use the memory and storage module in which a failure is likely to occur and its area and notifying the external computing device thereof. As a result, external computing devices and orchestrator can take proactive measures against the affected tasks, stabilize the operation of the entire system, and achieve appropriate QoS.

Fifth Embodiment

Next, a fifth embodiment will be described. In the fourth embodiment, the monitoring results of monitoring by the monitoring function unit 1906 for the areas (areas in use) allocated by allocating the capacity are used to predict and detect failures and to notify the potential failures or existing failures. Meanwhile, in the fifth embodiment, a request to allocate an area is processed and an area is allocated. During the process, areas where failures are likely to occur in the future are avoided, by predicting and detecting failures using the monitoring results when allocating the actual capacity, in a state before actually storing information (in a state in which the capacity is actually not secured).

A functional block diagram of the memory and storage pool device according to the fifth embodiment is omitted because the functional block diagram is substantially the same as the functional block diagram shown in FIG. 19. Meanwhile, while FIG. 19 shows a QoS control function unit 1907, an allocation management function unit 1903, and the failure prediction and detection function unit 1905 not directly connected to each other, but strictly speaking, the three functions are configured to be connected to each other in the fifth embodiment, since the functions operate in cooperation with each other.

In the fifth embodiment, the QoS control function unit 1907 has, in the process of examining a combination of memory and storage modules that can allocate areas while deriving internal QoS parameters, a function of instructing the failure prediction and detection function unit 1905 to derive the possibility of a failure occurring in the relevant area and a function of narrowing down candidate combinations based on the obtained possibility.

Figure 21:
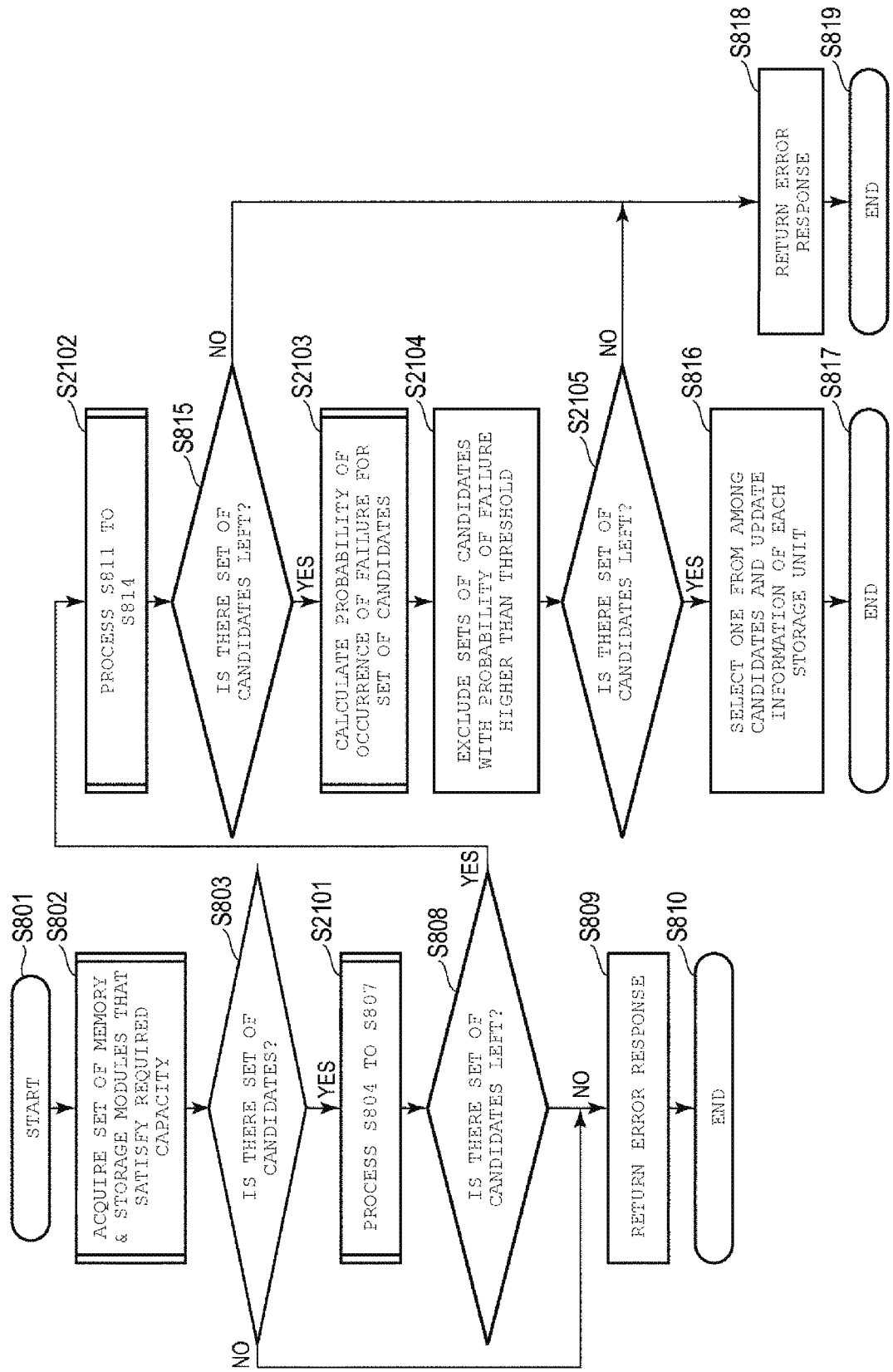
FIG. 21 is a flowchart showing a procedure for deriving internal QoS parameters in a memory and storage pool device according to a fifth embodiment.

FIG. 21 is a flowchart of the fifth embodiment based on the operation flow of the first embodiment (refer to FIG. 8). Although the operation flow may be similarly expanded from other embodiments, the first embodiment is used in the example. The same number is assigned to the steps of which process contents are the same as in the first embodiment.

Steps S2101 and S2102 are steps in which steps S804 to S807 and steps S811 to S814 described in the flowchart of FIG. 8 are put together for the sake of drawing space. Processing for the added function is steps S2103 to S2105. Step S2103 is a step in which the failure prediction and detection function unit 1905 calculates the failure occurrence possibility for one or more combinations remaining as candidates in the algorithm shown in FIG. 8. A specific method of calculating the possibility of occurrence is the same as the algorithm described in the fourth embodiment. Then a derivation unit 1908 excludes, from the candidates, combinations that may be determined to have a high possibility of failure at S2104. If a candidate remains in the end (S2105: YES), it is the same as in the first embodiment. If a plurality of candidates remains, the candidates may be selected in descending order of failure occurrence probability. If not (S2105: NO), the derivation unit 1908 returns an error response.

In the flowchart of FIG. 21, among the areas given as candidates at the start of the algorithm, areas with a high possibility of failure occurrence are simply excluded, and no other measures are taken. Meanwhile, for candidates that are determined to have a high possibility of failure occurrence and are excluded, the scope of affect is specified and whether the existing allocated area is affected, and if the area is affected, the area may be changed such that a failure notification is transmitted to the target request source (the process is not shown).

At S2103 of calculating the failure occurrence possibility for the candidate combination, the failure occurrence possibility is calculated for each memory and storage module that forms the combination, and then the failure occurrence possibility for the entire combination is obtained. Once the memory and storage modules are calculated, even if the combination is different, there is no need to calculate again.

Figure 22:
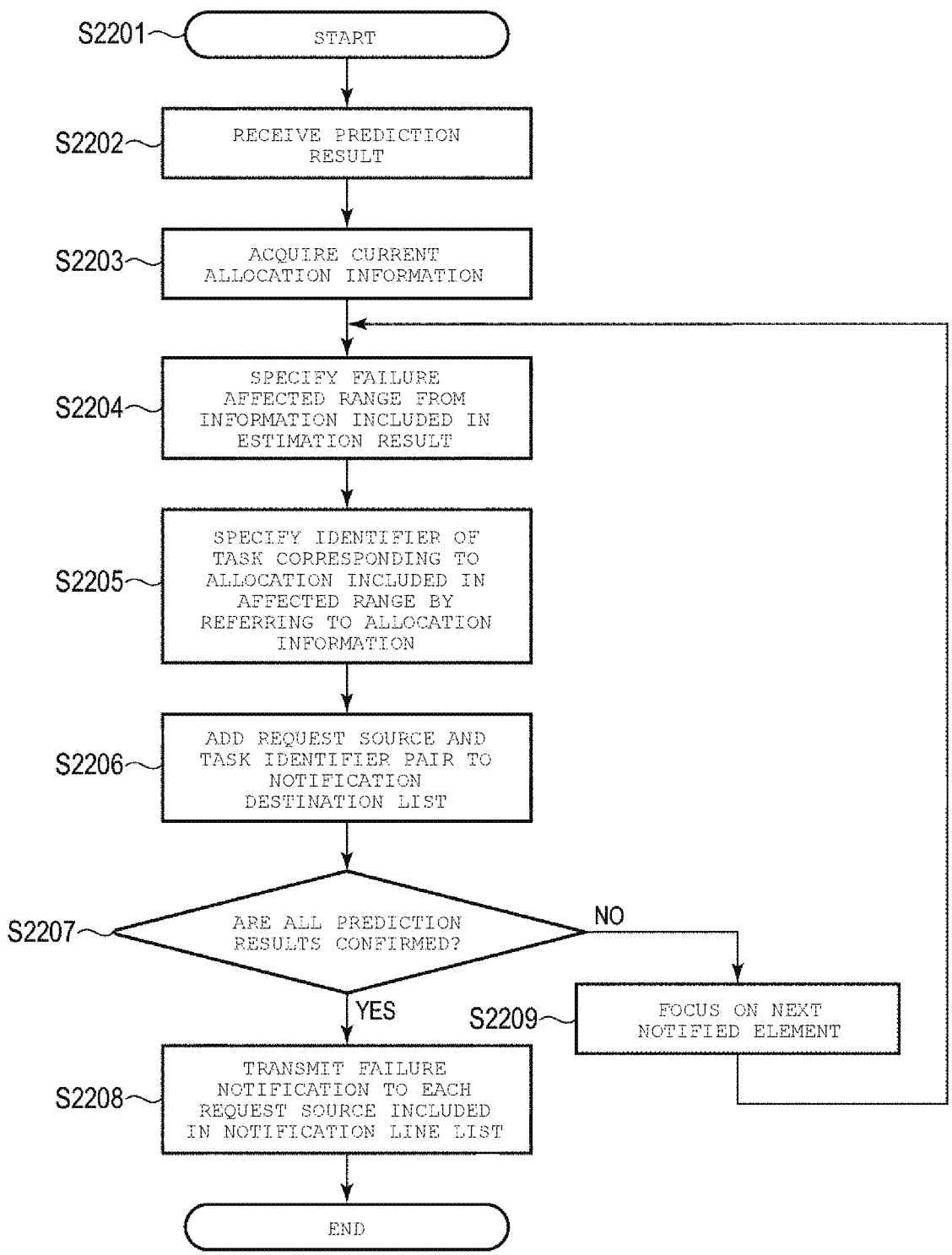
FIG. 22 is a detailed flowchart of step S2103 in FIG. 21.

FIG. 22 is a flowchart of process executed by the extended notification function unit 1904 at S2103 of the flow of FIG. 21. The process corresponds to steps S2007 to S2010 in the sequence diagram shown in FIG. 20, and the details are described below. Upon receiving the estimation result from the failure prediction and detection function unit 1905 (S2202), the extended notification function unit 1904 acquires the current allocation information from the allocation information storage unit 1912 (S2203: S2008 and S2009 in FIG. 20). Then the extended notification function unit 1904 refers to the information provided in the estimation result (including information such as the physical address where the failure is predicted and the tag used for access) and the allocation information acquired in the previous step (S2203), and specifies the affected range for each notified location (S2204). Here, the affected range refers to the range simultaneously affected around the notified address due to the structure of the memory and storage module when a failure occurs. The range is not limited to the allocated area including the notified address.

After specifying the affected range, the extended notification function unit 1904 specifies the allocated area including the range and acquires the identifier of the task corresponding thereto (S2205: S2010 in FIG. 20). The extended notification function unit 1904 stores the acquired information as a notification destination list (S2206). Then the extended notification function unit 1904 determines whether all the estimation results notified from the failure prediction and detection function unit 1905 are checked (S2207).

When all estimation results are confirmed (S2207: YES), the extended notification function unit 1904 transmits a failure notification to the request allocating source based on the information stored as the notification list (S2208: S2010 in FIG. 20). If there are still estimation results to be confirmed (S2207: NO), the extended notification function unit 1904 focuses on the next notified element (S2209) and returns to S2204.

Figure 23:
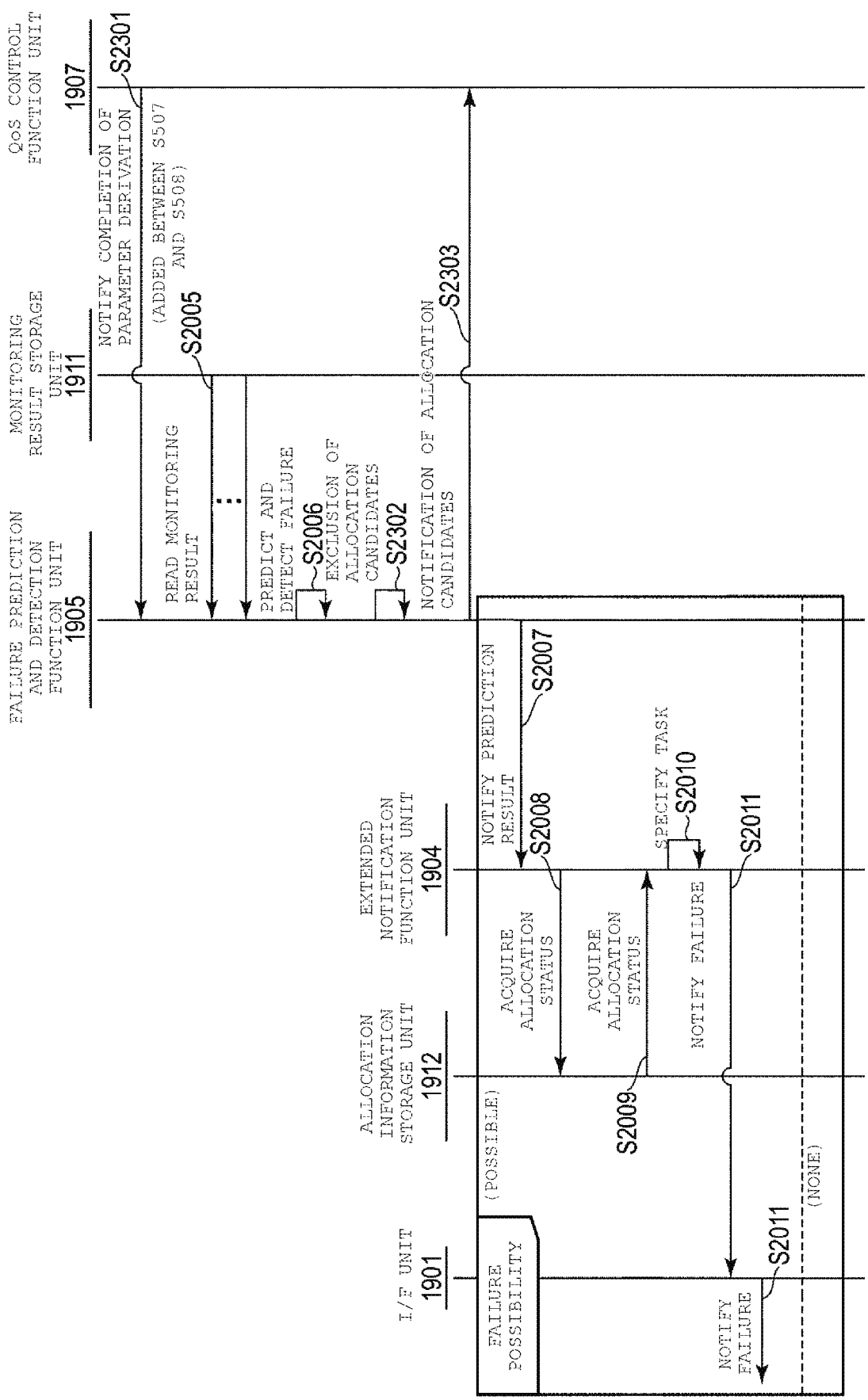
FIG. 23 is a sequence diagram showing a flow of predicting and detecting a potential failure in the memory and storage pool device according to the fifth embodiment.

FIG. 23 is a sequence diagram showing a flow of failure prediction and detection in the memory and storage pool device according to the fifth embodiment. FIG. 23 describes new operations to be added until the QoS control function unit 1907 completes the derivation of the internal QoS parameters and stores the internal QoS parameters in a QoS parameter storage unit 1910. The sequence is started by the QoS control function unit 1907 notifying the failure prediction and detection function unit 1905 of the area of the memory and storage module that is a candidate at the timing when the internal QoS parameter derivation is completed (S2301). The failure prediction and detection function unit 1905 receiving the notification refers to the monitoring result storage unit 1911 to read the monitoring result, and performs failure estimation and detection operation (since the step is the same as S2005 and S2006 in FIG. 20, the same number is given). Next, the failure prediction and detection function unit 1905 excludes candidates with a high possibility of failure occurrence from the allocation candidates (S2302) (the step corresponds to S2104 described in the flowchart of FIG. 21). Then, the failure prediction and detection function unit 1905 returns only candidates with a low possibility of failure occurrence to the QoS control function unit 1907 as a response (S2303). The subsequent operation of the failure prediction and detection function unit 1905 is the same as that of the fourth embodiment shown in FIG. 20 (S2007 to S2011).

The memory and storage pool device 1900 according to the fifth embodiment has been described above. In the memory and storage pool device 1900 according to the fifth embodiment, by preliminarily excluding areas where there is a high possibility of occurrence of failure when processing an allocation request, the operation of the system may be stabilized, and external QoS requests may be stably satisfied. Even for an allocated area, which is likely to fail when excluding candidates, by transmitting a notification including information on the tasks that use the allocated area, it is possible to deal with failures before occurrence, thereby appropriately maintaining the QoS of the entire system.

Sixth Embodiment

Next, a sixth embodiment will be described. The sixth embodiment is a modification of the fifth embodiment. In the fifth embodiment, the possibility of failure occurrence is calculated in the step of allocating the area (S2103 in FIG. 21). Here, time is needed for calculation of the possibility of failure occurrence when allocating the area, so there is concern that the step will take time. To address such an issue, in the sixth embodiment, the possibility of failure occurrence is calculated in advance and the estimation result is referred to, thereby shortening the time required to allocate the area.

Figure 24:
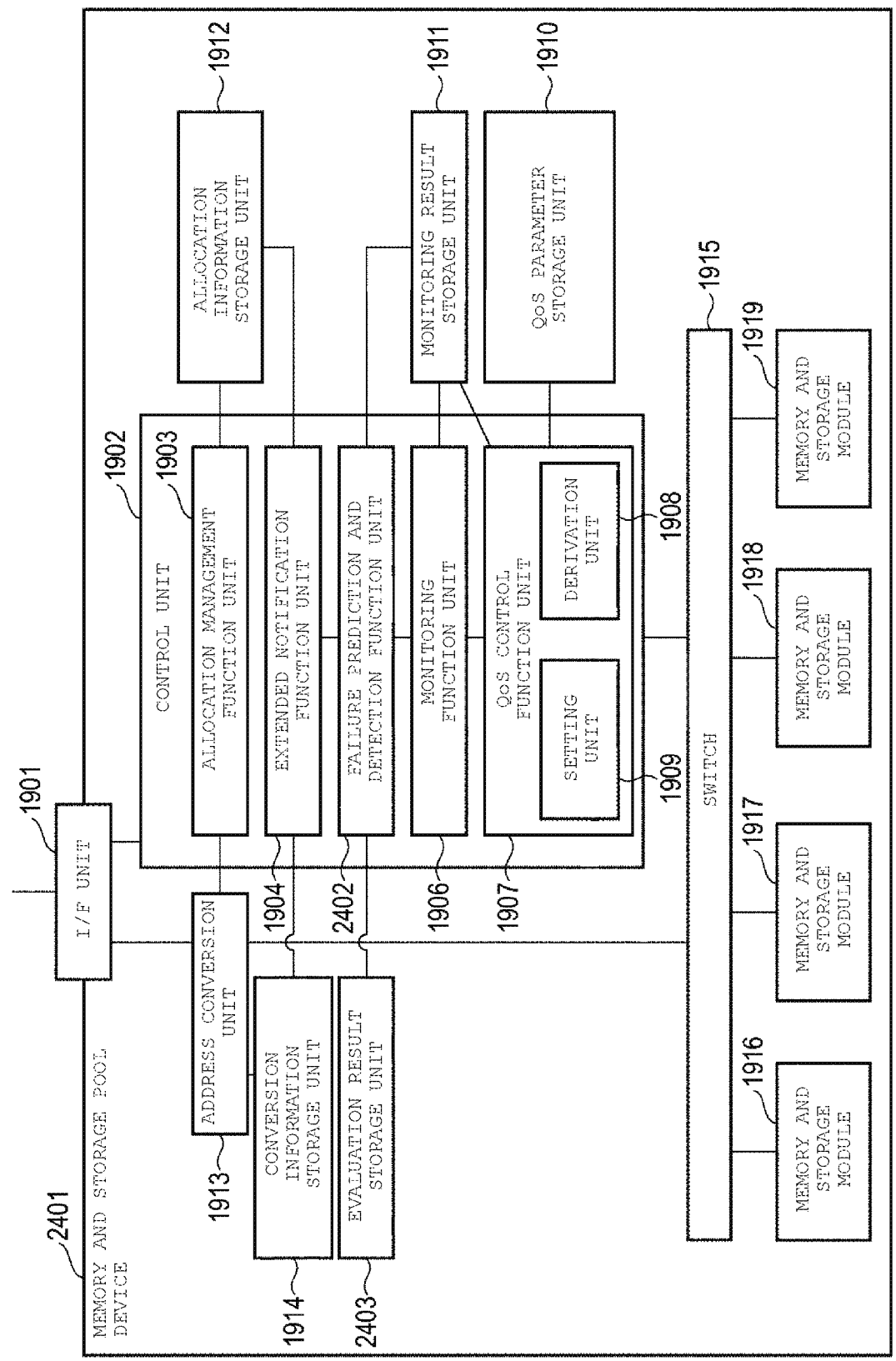
FIG. 24 is a diagram showing a configuration example of a memory and storage pool device according to a sixth embodiment.

FIG. 24 is a functional block diagram of a memory and storage pool device 2401 according to the sixth embodiment. The memory and storage pool device 2401 is added with an evaluation result storage unit 2403 that stores the estimation result of calculating the possibility of occurrence of a failure periodically executed by a failure prediction and detection function unit 2402.

FIG. 25 is a diagram showing an example of information stored in the evaluation result storage unit 2403. Each entry includes a time when failure prediction and detection process was performed and stored (storage time field), a memory and storage module targeted for prediction and detection process (evaluation target field), a possibility that the failure occurs (failure possibility field), and content of the predicted or detected failure (failure description field). If the range of failure can be clearly managed, a field including that range may also be managed together therewith.

The entries in FIG. 25 are appropriately added each time the failure prediction and detection function unit 2402 calculates the possibility of failure. When a predetermined period of time elapses after storing the entry, or when the number of entries for the same evaluation target exceeds a threshold, old entries may be deleted.

In the sixth embodiment, when it is necessary to execute failure prediction and detection process at current time 15 (T5≥T4, |T5−T4|≤T, T is a threshold value for freshness of storing), by referring to the latest storage time T4, it is concluded that the possibility of occurrence of a failure of throughput reduction in a memory and storage module M1 is $V_{41}$. If the storage time T3 satisfies |T5−T3|>T (=storage freshness is low), the failure prediction and detection function unit 2402 may not refer to the information and newly execute failure prediction and detection process for a memory and storage module M2.

Figure 26:
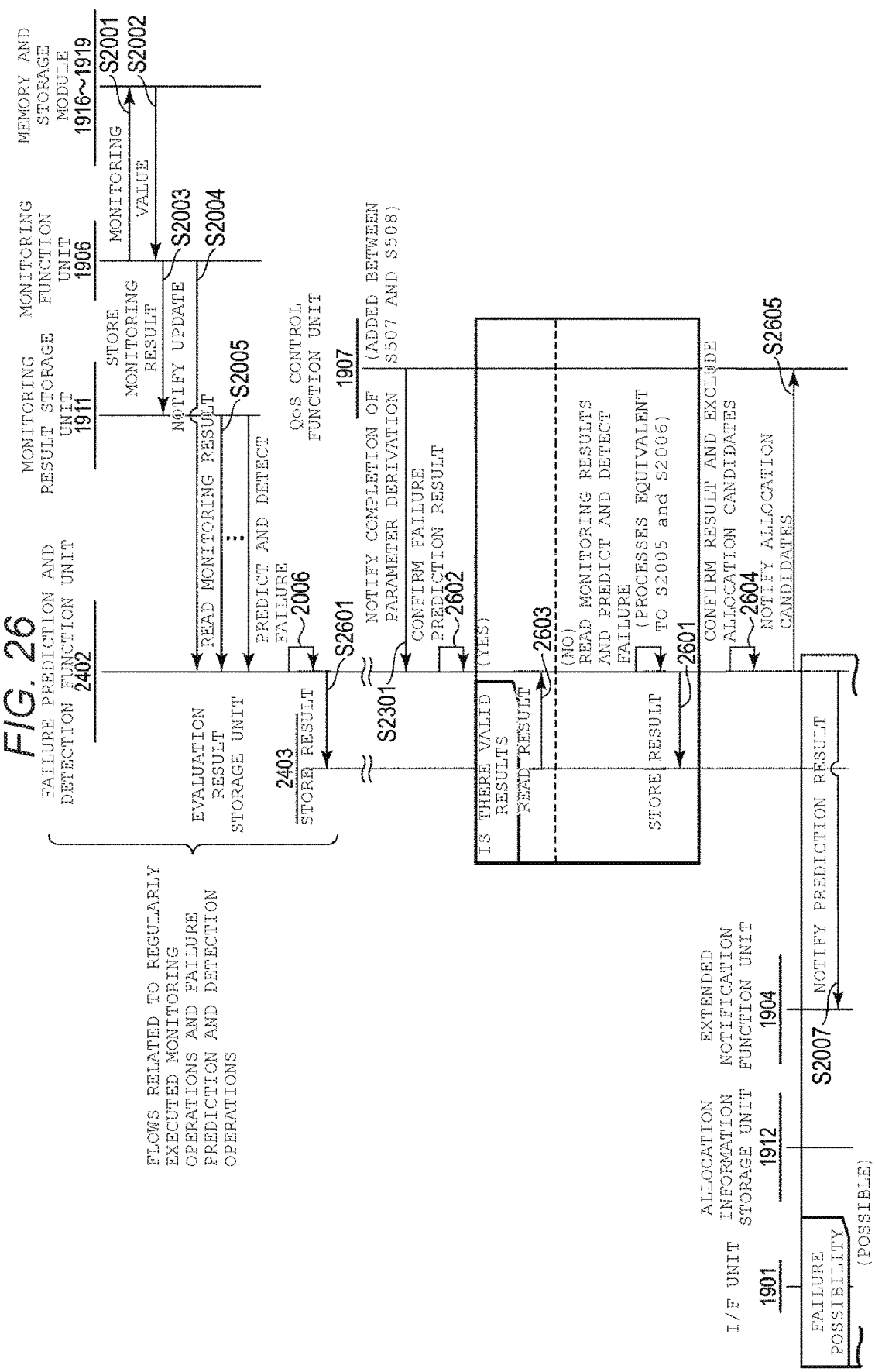
FIG. 26 is a sequence diagram showing a flow of predicting and detecting a failure in the memory and storage pool device according to the sixth embodiment.

The flowchart of the sixth embodiment shown in FIG. 26 is obtained by replacing the flowchart of the fifth embodiment shown in FIG. 21 such that the past calculation result is referred to without calculating the possibility at S2103. Therefore, the flowchart corresponding to FIG. 21 is omitted.

FIG. 26 is a sequence diagram showing a flow of failure prediction and detection in the memory and storage pool device according to the sixth embodiment. As described above, in the sixth embodiment, the failure prediction and detection function unit 2402 stores the monitoring results of monitoring operations and the estimation results of failure prediction and verification operations that are executed periodically. The operations for that purpose are shown in the upper half of FIG. 26, and at S2601, the failure prediction and detection function unit 2402 stores the estimation results of failure estimation and detection together with the execution time in the evaluation result storage unit 2403.

As in the fifth embodiment, the QoS control function unit 1907 notifies the failure prediction and detection function unit 2402 that the derivation of internal QoS parameters is completed (S2301). Then the failure prediction and detection function unit 2402 determines whether there is an estimation result for the memory and storage module corresponding to the notified candidate area (S2602). The failure prediction and detection function unit 2402 reads an appropriate result if there is the appropriate result (S6503), and reads the monitoring result by the method described in the fourth embodiment if there is no appropriate result and performs prediction and detection process for failures. Then the failure prediction and detection function unit 2402 checks the results, and performs exclusion process from allocation candidates as necessary (S2604). Next, the failure prediction and detection function unit 2402 returns the results to the QoS control function unit 1907 (S2605). Subsequent processes are the same as in the fifth embodiment (S2007 to S2011).

The memory and storage pool device 1900 according to the sixth embodiment has been described above. In the memory and storage pool device 1900 according to the sixth embodiment, in addition to the effects of the fifth embodiment, candidates are narrowed down at the time of area allocation using the results of pre-evaluated failure prediction and detection process, so that area allocation may be implemented in which it is easy to stably allocate external QoS in a shorter time.

Seventh Embodiment

Next, a seventh embodiment will be described. The seventh embodiment is a modification of the sixth embodiment. In the sixth embodiment, the result of failure prediction and detection executed in advance in the step of allocating the area is referred to, and candidates with a high possibility of occurrence of a failure are excluded. Meanwhile, there is also an allocation method in which the area to be used is not determined until the information is actually stored (thin provisioning, and the like). Here, it is considered that external QoS may be allocated more easily by confirming the failure occurrence possibility in the candidate area and storing the information in an area with a low possibility of failure at the timing of storing the information. However, it is necessary to specify an area with a low possibility of failure occurring in a very short time, and the method described in the fifth or sixth embodiment cannot be applied.

To address the issue, in the seventh embodiment, for each area allocated at the time of receiving an area allocation request, a list "allocatable list" is prepared in units of small fixed-length fragments with a low failure occurrence possibility, and when an information storage request occurs, the required size is taken out from the list for use.

Figure 27:
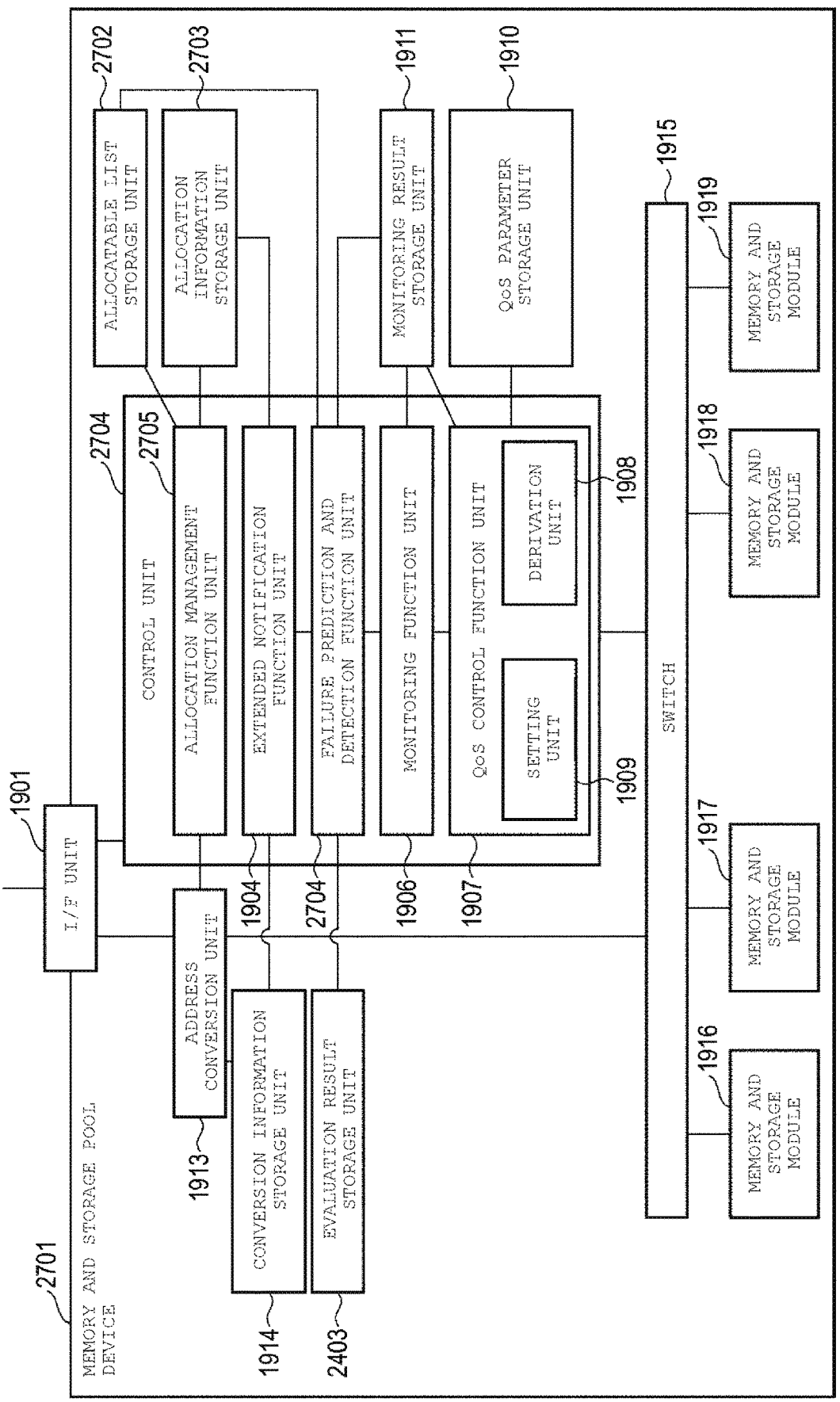
FIG. 27 is a diagram showing a configuration example of a memory and storage pool device according to a seventh embodiment.

FIG. 27 is a functional block diagram of a memory and storage pool device 2701 according to the seventh embodiment. An allocatable list storage unit 2702 that stores the "allocatable list" described above is added to the functional blocks of the sixth embodiment. New reference numerics are assigned to the parts related thereto, since the parts are changed as appropriate.

FIG. 28 is a diagram showing an example of an allocatable list stored in the allocatable list storage unit 2702. The allocatable list in FIG. 28A has one entry for each area, and each entry is including a list in which information corresponding to update times and a plurality of fragments is stored. The entry is created as a result obtained by executing, by the memory and storage pool device 2701, receiving a request to allocate an area and deriving internal QoS parameters. For example, it is added to the allocatable list storage unit 2702 at the timing following step S207 in FIG. 2. One entry corresponds to one entry of the allocation information shown in FIG. 4.

FIG. 28B is another example of the allocatable list. In the allocation information shown in FIG. 4, when one area includes a plurality of memory and storage modules, since the locations where failures may occur differ for each memory and storage module, it may be configured in a way that separates the lists. In FIG. 28B, a device field is added, and a fragment information list is constructed for each device in the same area. When fragment information is stored, a plurality of continuous fragments may be collectively managed in the form of "address of leading fragment" and "the number".

A failure prediction and detection function unit 2704 in the seventh embodiment executes, in addition to the result storing process of storing the results in the evaluation result storage unit 2403 described in the fifth embodiment, a process of creating a list of small fragments forming each allocated area, and updating the allocatable list storage unit 2702. In the fifth embodiment, when the range in which failures may occur is clear, the information is stored in the form of specifying the part. In contrast, in the seventh embodiment, the parts with no possibility of failure are added to the allocatable list storage unit 2702. For example, if it is predicted that the range of addresses A1 to A2 has a high failure occurrence possibility, element 1 in FIG. 28 stores information on a fragment from the beginning to just before address A1, and element 2 stores information on a fragment from address A2 to the end of the allocated area. Instead of adding all the fragments to the allocatable list storage unit 2702, certain upper limit may be set and the fragments may be registered up to that number.

An allocation management function unit 2705 performs an added process of referring to the list stored in the allocatable list storage unit 2702 described above and determining the storage location when a fragment for actually storing information is requested.

The above are the changes in the functional block diagram of the memory and storage pool device 2701 according to the seventh embodiment from the functional block diagram of the memory and storage pool device 2401 according to the sixth embodiment. It should be noted that the operation flow and operation sequence of the seventh embodiment will be omitted since the operation flow and operation sequence are self-explanatory from the description of the functional block diagram of the sixth embodiment.

The seventh embodiment has been described above. In addition to the effects of the sixth embodiment, by making it possible to respond to the method of allocating the capacity of the memory and storage module used immediately before actually storing information, the memory and storage pool device 2701 of the seventh embodiment may increase the utilization efficiency of the memory and storage module and also limit the storage location using the result of pre-evaluated failure prediction and detection process, thereby making it easier to achieve external QoS in a shorter time.

Eighth Embodiment

In each of the first to seventh embodiments described so far, the monitoring function, the allocation management function, the failure prediction and detection function, and the like are executed on the memory and storage pool device side. Meanwhile, in the eighth embodiment, the functions are executed as software on an external computing device. Here, although the fourth embodiment is described as an example, other embodiments may be implemented in the same way.

FIG. 29 is a schematic diagram of a system that implements the eighth embodiment. The drawing shows an aspect in which an external computing device 2901 and memory and storage pool devices 2920A and 2920B are connected to each other via certain communication channel. Although two memory and storage pool devices are shown in FIG. 29, the number of the devices is not limited to two. The communication channel may be a network using IEEE 802.3, or a network that directly transmits and receives the protocol of the local bus via optical fiber.

The external computing device 2901 includes a processor group 2904 including one or more processors, a local memory 2905, and an I/F unit 2906 that communicates with the outside. Other components that generally make up a computer are not shown in FIG. 29. On the external computing device 2901, an OS/virtualization mechanism 2915 that abstracts hardware and enables execution of a plurality of applications operates. Then, virtual machine (VM) groups 2902A, 2902B, . . . and container groups 2902C and 2902D are operated. A memory and storage pool management function unit 2903 is operated in the same manner as VMs and containers.

The memory and storage pool management function unit 2903 performs a function corresponding to the control unit 1902 described in the fourth embodiment. An allocation management function unit 2907, an extended notification function unit 2908, a failure prediction and detection function unit 2912, a monitoring function unit 2910, and an address conversion function unit 2913 are each implemented as software. Data used by each function during execution is stored in the local memory 2905, and among the data, the characteristic information of the eighth embodiment is the information stored in a monitoring result storage unit 2911, an allocation information storage unit 2909, and a conversion information storage unit 2914. Although a dedicated name is given in the example, the data is the data that is stored in an area allocated on the local memory 2905 in an appropriate structure.

The VMs and containers operating on the processor group 2904 transmit requests to the memory and storage pool management function unit 2903 when memory and storage resources on the memory and storage pool device are required, and are allocated with areas. Access to the allocated area by the VM or container is transmitted to the address conversion function unit 2913 of the memory and storage pool management function unit 2903 with the support of the OS/virtualization mechanism 2915. Then, the logical address of the access destination is rewritten to a physical address corresponding to the allocated memory and storage pool device and its internal memory and storage module. An access request to the rewritten memory and storage pool device is transmitted to an appropriate memory and storage pool device through the I/F unit 2906.

Upon receiving the access request including the address converted by the address conversion function unit 2913, the memory and storage pool device 2920A or 2920B interprets the access request by a control unit 2922A or 2922B, and executes as a process for an appropriate memory and storage module 2923A to 2926A or 2923B to 2926B.

The operation of each function in the system schematic diagram shown in FIG. 29 is same as the operation explained above in the first to seventh embodiments. However, since each function of the control unit is executed on an external computing device connected via a network, the monitoring process executed by the monitoring function unit is limited to a method of monitoring via certain network rather than a method of monitoring closed in the apparatus. Other operations are the same as those of the embodiments described in the first to seventh embodiments.

In FIG. 29, the memory and storage pool management function is described as being executed on an external computing device on which VMs and containers operate. However, the function may be executed on a dedicated external computing device, or may be executed on a device that performs an orchestrator function that manages the resources of the external computing device.

In FIG. 29, it is assumed that the address conversion function unit is also implemented by software in the memory and storage pool management function unit. However, for the purpose of performing address conversion at high speed, a network interface or dedicated hardware may be prepared and offloaded to that part. Here, by offloading the address conversion function unit 2913 and the conversion information storage unit 2914 and also defining an application interface for operating the contents of the conversion information storage unit 2914 from the outside, the unit can be appropriately controlled from the memory and storage pool management function unit executed as software.

The eighth embodiment has been described above. As explained at the outset, it is equally applicable not only to the fourth embodiment, but also to other embodiments. By separating the management function that requires complicated process from the memory and storage pool, it is possible to simplify the memory and storage pool device, thereby improving the stability of the system. As a result, QoS of a system can be improved.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An information storage device connectable to one or more computing devices via a communication channel, the device comprising:
a storage unit including one or more storage devices;
a control unit including an allocation management function unit configured to control the storage unit, creates a logical storage area using storage areas of the one or more storage devices when a storage area allocation request is received from the computing device, and manages the logical storage area in association with the computing device that is a transmission source of the allocation request;
an allocation information storage unit configured to store allocation information of the storage areas of the one or more storage devices related to the logical storage area managed by the allocation management function unit;
a quality of service (QoS) parameter storage unit configured to store all or part of quality requests expected to be satisfied in the communication channel for a communication for using the logical storage area; and
a monitoring result storage unit configured to store result of monitoring for the storage unit and the communication channel, wherein
the control unit further includes
a monitoring function unit configured to monitor an operating state of the storage unit, characteristics of the one or more storage devices provided in the storage unit which change with use, and a communication status of the communication channel, and stores the results in the monitoring result storage unit, and a QoS control function unit configured to derive internal QoS parameters to be set in the information storage device from information stored in the allocation information storage unit, the QoS parameter storage unit, and the monitoring result storage unit and store the internal QoS parameters in the QoS parameter storage unit in association with a quality request for the communication channel.

2. The information storage device according to claim 1, wherein the QoS control function unit derives new internal QoS parameters when a request to allocate a new logical storage area, a request to change an allocated logical storage area, or a request to change the quality request for an allocated logical storage area is received.

3. The information storage device according to claim 2, wherein the QoS control function unit stops deriving the new internal QoS parameters, when it is determined that the new internal QoS parameters cannot coexist with the set internal QoS parameters due to a process priority for storing information in the storage unit or reading from the storage unit, a bandwidth used for storing information in the storage unit or reading from the storage unit, or a transmission priority in the internal communication channel of the information storage device in the process of deriving the new internal QoS parameters, and the allocation management function unit rejects the received request.

4. The information storage device according to claim 3, wherein, when the QoS control function unit determines that a first internal QoS parameter, which is the new internal QoS parameter, cannot coexist with a second internal QoS parameter, which is a previously set internal QoS parameter, the QoS control function unit compares the monitoring result stored in the monitoring result storage unit with the quality request for the allocated logical storage area and the second internal QoS parameter, and when the quality request is determined to be achievable even if the second internal QoS parameter is changed, the QoS control function unit derives a third internal QoS parameter different from the first internal QoS parameter and the second internal QoS parameter.

5. The information storage device according to claim 4, wherein the QoS control function unit is configured to change a minimum allocation unit used for deriving the internal QoS parameter to derive the third internal QoS parameter.

6. The information storage device according to claim 2, wherein the monitoring function unit is configured to compare the quality request corresponding to the allocated logical storage area with a monitoring result to determine whether a review condition is satisfied, and if the condition is satisfied, the monitoring function unit if configured to notify the QoS control function unit to review the internal QoS parameter together with the satisfied condition, and the QoS control function unit is configured to review the internal QoS parameters such that the conditions notified from the monitoring function unit are invalidated.

7. The information storage device according to claim 6, wherein, when reviewing the internal QoS parameters, the QoS control function unit is configured to perform review in the following order: (1) a review of changing the process priority without changing the allocated logical storage area, (2) a review changing the internal QoS parameters for fulfilling the quality request in case the information stored in allocated logical storage areas is not moved into other logical storage areas in the storage unit and reading from the allocated logical storage areas and writing into the allocated logical storage areas are performed, and (3) a review changing the internal QoS parameters for fulfilling the quality request in case at least a part of the information stored in allocated logical storage areas is moved into other logical storage areas in the storage unit.

8. The information storage device according to claim 6, wherein the monitoring function unit is configured to monitor, as an event that affects the characteristics of the one or more storage devices or as an event that captures changes in the characteristics, the number of reads, writes and erasures with respect to each allocated logical storage area, an error rate, the number of times error correction process is executed by an error correction algorithm, the number and interval of garbage collection runs to reuse storage areas where invalid information is stored.

9. An information storage device connectable to one or more computing devices via a communication channel, the device comprising:

a storage unit including one or more storage devices;

a control unit including an allocation management function unit configured to control the storage unit, create a logical storage area using storage areas of the one or more storage devices when a storage area allocation request is received from the computing device, and manage the logical storage area in association with the computing device that is a transmission source of the allocation request;

an allocation information storage unit configured to store allocation information of the storage areas of the one or more storage devices related to the logical storage area managed by the allocation management function unit;

a monitoring result storage unit configured to store a result of monitoring the storage unit;

a conversion information storage unit configured to store a first address provided in a request to read or write information that can be received via the communication channel regarding an identifier of a service that uses the logical storage area executed on the computing device and the service, in association with an identifier of the storage device and a second address representing a physical location in the storage device; and an address conversion unit configured to convert the first address into an identifier of the storage device and the second address based on the information stored in the conversion information storage unit, wherein the allocation management function unit is configured to acquire an identifier of the service, and store the identifier in the allocation information storage unit in association with the logical storage area, the control unit further includes a monitoring function unit configured to monitor normality of the one or more storage devices provided in the storage unit, and stores, in the monitoring result storage unit, a monitoring time, a monitored storage device, an address of the storage device to be monitored, a monitoring item, and a result of monitoring, a failure prediction and detection function unit configured to detect that at least one of the one or more storage devices is failed or that a failure may occur, based on the result of monitoring stored in the monitoring result storage unit, and an extended notification function unit configured to, when a failure or potential failure of the storage device is detected, specify a service that uses a logical storage area that includes a storage area of a storage device in which the failure or possible failure is detected, and a computing device that requested allocation of the logical storage area for the service, and transmit a notification of the failure or possible failure together with an identifier of the service to the computing device based on the service identifier stored in the allocation information storage unit and the address information stored in the conversion information storage unit.

10. The information storage device according to claim 9, wherein the failure prediction and detection function unit is configured to execute a failure prediction and detection process when the monitoring function unit receives an alert regarding a failure or state change of the storage device from the storage device, or at preset regular timing.

11. The information storage device according to claim 10, wherein the failure prediction and detection function unit is configured to set a threshold for alert generation for the monitoring item of the monitoring function unit.

12. The information storage device according to claim 11, wherein the failure prediction and detection function unit is configured to set thresholds for a plurality of monitoring items collectively, the monitoring items being set to have a correlation in advance or determined to have a correlation in a process of prediction and detection.

13. The information storage device according to claim 11, wherein the failure prediction and detection function unit is configured to set the threshold according to a failure occurrence probability and a load on the information storage device.

14. The information storage device according to claim 10, wherein the failure prediction and detection function unit is configured to set a monitoring interval for the monitoring item based on the monitoring result of the monitoring function unit.

15. The information storage device according to claim 14, wherein the failure prediction and detection function unit is configured to set a monitoring interval according to a failure occurrence possibility and a load on the information storage device.

16. The information storage device according to claim 9, further comprising an evaluation result storage unit configured to store a result of failure prediction and detection by the failure prediction and detection function unit, wherein
when determining whether the logical storage area can be allocated in response to the storage area allocation request from the computing device, the control unit is configured to determine whether a failure is predicted and detected for the logical storage area to be allocated based on the result of failure prediction and detection stored in the evaluation result storage unit.

17. The information storage device according to claim 16, wherein, when a failure is predicted or detected for the logical storage area to be allocated, the control unit is configured to notify the computing device of the predicted or detected failure together with the identifier of the service via the extended notification function unit.

18. The information storage device according to claim 9, further comprising an allocatable list for storing information on a group of fragments with a low failure occurrence possibility obtained from the result of execution at the failure prediction and detection function unit for the allocated logical storage area, wherein
when storing information in the allocated logical storage area, the control unit is configured to acquire a fragment with a low failure occurrence possibility from the allocatable list and stores the information in the fragment.

19. The information storage device according to claim 18, wherein, when the storage area allocation request is received, the control unit is configured to
execute a failure prediction and detection process using the failure prediction and detection function unit and generates the allocatable list based on a result thereof, and
periodically execute the failure prediction and detection process at preset intervals using the failure prediction and detection function unit to update the allocatable list.

20. A control system including a computing device and an information storage device, in which the computing device and the information storage device are connected to each other via a communication channel, wherein
the information storage device includes
a storage unit including one or more storage devices, and
a control unit configured to control the storage unit, and
the computing device includes
an allocation management function unit configured to create and manage a logical storage area using storage areas of the one or more storage devices,
an allocation information storage unit configured to store allocation information of the storage areas of the one or more storage devices related to the logical storage area managed by the allocation management function unit,
a QoS parameter storage unit configured to store all or part of communication quality requests expected to be satisfied in the communication channel for a communication for using the logical storage area,
a monitoring result storage unit configured to store result of monitoring for the storage unit and the communication channel,
a monitoring function unit configured to monitor an operating state of the storage unit, characteristics of the one or more storage devices provided in the storage unit which change with use, and a communication status of the communication channel, and store the results in the monitoring result storage unit, and
a QoS control function unit configured to derive internal QoS parameters to be set in the information storage device from the information stored in the allocation information storage unit, the QoS parameter storage unit, and the monitoring result storage unit and store the internal QoS parameters in the QoS parameter storage unit in response to a communication quality request for the communication channel.

21. A control system including a computing device and an information storage device, in which the computing device and the information storage device are connected to each other via a communication channel, wherein
the information storage device includes
a storage unit including one or more storage devices, and
a control unit configured to control the storage unit, and
the computing device includes,
an allocation management function unit configured to create and manage a logical storage area using storage areas of the one or more storage devices,
an allocation information storage unit configured to store allocation information of the storage areas of the one or more storage devices related to the logical storage area managed by the allocation management function unit,
a monitoring result storage unit configured to store a result of monitoring the storage unit, a conversion information storage unit configured to store a first address provided in a request to read or write information that can be received via the communication channel regarding an identifier of a service that uses the logical storage area executed on the computing device and the service, in association with an identifier of the storage device and a second address representing a physical location in the storage device, and an address conversion unit configured to convert the first address into an identifier of the storage device and the second address based on the information stored in the conversion information storage unit, the allocation management function unit configured to acquire an identifier of the service, and store the identifier in the allocation information storage unit in association with the logical storage area, and the control system further includes a monitoring function unit configured to monitor normality of the one or more storage devices provided in the storage unit, and store, in the monitoring result storage unit, a monitoring time, a monitored storage device, an address of the storage device to be monitored, a monitoring item, and a result of monitoring, a failure prediction and detection function unit configured to detect that at least one of the one or more storage devices provided in the storage unit is failed or that a failure may occur, based on the result of monitoring stored in the monitoring result storage unit, and an extended notification function unit configured to, when a failure or possible failure of the storage device is detected, specify a service that uses a logical storage area that includes a storage area of a storage device in which the failure or possible failure is detected, and a computing device that requested allocation of the storage area for the service, and transmit a notification of the failure or possible failure together with an identifier of the service to the computing device based on the service identifier stored in the allocation information storage unit and the address information stored in the conversion information storage unit.

22. A method for controlling an information storage device including a storage unit including one or more storage devices connectable to one or more computing devices via a communication channel, the method comprising:

creating a logical storage area using storage areas of the one or more storage devices when a storage area allocation request is received from the computing device, and managing the logical storage area in association with the computing device that is a transmission source of the allocation request;

storing allocation information of the storage areas of the one or more storage devices related to the logical storage area;

storing all or part of communication quality requests expected to be satisfied in the communication channel for a communication for using the logical storage area;

monitoring an operating state of the storage unit, characteristics of the one or more storage devices provided in the storage unit which change with use, and a communication status of the communication channel, and storing the results; and deriving an internal QoS parameter to be set in the information storage device from the stored allocation information, communication quality request and monitoring result, and storing the parameter in association with the communication quality request for the communication channel.

23. A method for controlling an information storage device including a storage unit including one or more storage devices connectable to one or more computing devices via a communication channel, the method comprising:

creating a logical storage area using storage areas of the one or more storage devices when a storage area allocation request is received from the computing device, and managing the logical storage area in association with the computing device that is a transmission source of the allocation request;

storing a first address provided in a request to read or write information that can be received via the communication channel regarding an identifier of a service that uses the logical storage area executed on the computing device and the service, in association with an identifier of the storage device and a second address representing a physical location in the storage device;

converting the first address into the identifier of the storage device and the second address based on a correspondence between the stored first address and the identifier of the storage device and the second address;

acquiring an identifier of the service and storing the same in association with the logical storage area;

monitoring normality of the one or more storage devices provided in the storage unit, and storing a monitoring time, a monitored storage device, an address of the storage device to be monitored, a monitoring item, and a result of monitoring;

detecting that at least one of the one or more storage devices provided in the storage unit is failed or that a failure may occur based on the stored result of monitoring; and specifying a service that uses a logical storage area that includes a storage area of a storage device in which a failure or possible failure is detected, and a computing device that requested allocation of the logical storage area for the service, and transmitting a notification of the failure or possible failure together with an identifier of the service to the computing device based on the stored identifier of the service and the correspondence between the stored first address, and the identifier of the storage device and the second address when the failure or possible failure of the storage device is detected.

* * * * *